US012596691B2

(12) United States Patent
Thimmaiah et al.

(10) Patent No.: US 12,596,691 B2
(45) Date of Patent: Apr. 7, 2026

(54) COMPUTING SYSTEM FOR GENERATING AND OPTIMIZING SCHEMA-CONFORMANT OBJECT MODELS

(71) Applicant: Type Five Inc., Berkeley, CA (US)

(72) Inventors: Tim Thimmaiah, Oakland, CA (US); Aleksis Bertoni, Berkeley, CA (US); Ian Miley, Berkeley, CA (US); Pieter Schiettecatte, Ghent (BE)

(73) Assignee: Type Five Inc., Berkeley, CA (US)

( * ) Notice: Subject to any disclaimer, the term of this patent is extended or adjusted under 35 U.S.C. 154(b) by 0 days.

(21) Appl. No.: 19/339,938

(22) Filed: Sep. 25, 2025

(65) Prior Publication Data

US 2026/0086985 A1     Mar. 26, 2026

Related U.S. Application Data

(60) Provisional application No. 63/699,107, filed on Sep. 25, 2024.

(51) Int. Cl.
| | |
|---|---|
| *G06F 16/20* | (2019.01) |
| *G06F 16/21* | (2019.01) |
| *G06F 40/205* | (2020.01) |
| *G06F 40/284* | (2020.01) |
| *G06Q 10/10* | (2023.01) |

(52) U.S. Cl.
CPC .......... *G06F 16/211* (2019.01); *G06F 40/205* (2020.01); *G06F 40/284* (2020.01); *G06Q 10/103* (2013.01)

(58) Field of Classification Search
None
See application file for complete search history.

(56) References Cited

U.S. PATENT DOCUMENTS

| | | | | |
|---|---|---|---|---|
| 8,024,349 B1 * | 9/2011 | Shao | .................... | G06F 16/3338 |
| | | | | 707/769 |
| 2020/0210647 A1 * | 7/2020 | Panuganty | ........ | G06F 16/24578 |
| 2021/0073449 A1 * | 3/2021 | Segev | .................... | G06F 30/27 |

* cited by examiner

*Primary Examiner* — Jau Shya Meng
(74) *Attorney, Agent, or Firm* — Hipp Law

(57) ABSTRACT

A computing system is disclosed for generating and optimizing schema-conformant object models. The system obtains input data from multiple sources in structured, semi-structured, or unstructured formats and processes the data using parsing logic to derive a structured rule set defining spatial relationships and constraint conditions. The system generates schema-conformant object representations comprising parametric assemblies, applies the constraint conditions using machine-executed resolution logic, and produces candidate object models through iterative modification of spatial components, dimensional parameters, and adjacency relationships. Performance values are computed for the candidate models using quantitative evaluation of spatial efficiency, material usage, and constraint compliance. An optimized object model is selected based on the computed performance values and may be used to generate construction project plans including technical drawings, material specifications, and scheduling instructions.

20 Claims, 10 Drawing Sheets

402 — Obtain Input Data

404 — Parse and Normalize Inputs

406 — Derive Constraint Rule Set

408 — Generate Object Representation

410 — Receive Configuration Payload

412 — Integrate Preferences and Targets

414 — Apply Constraint Resolution

416 — Generate Candidate Object Models

418 — Compute Performance Values

420 — Generate Optimized Object Model

422 — Generate Project Plans

502 — Obtain Spatial Input Data

504 — Normalize Coordinates and Units

506 — Parse and Tokenize Constraints

508 — Derive Structured Rule Set

510 — Generate Object Representation

512 — Propagate Metadata Across Assemblies

514 — Apply Constraint Resolution Logic

602    Initialize Candidate Framework

604    Iteratively Modify Object Representation

606    Render Candidate Models

608    Compute Performance Metrics

610    Rank Candidate Models

612    Select Optimized Model

COMPUTING SYSTEM FOR GENERATING AND OPTIMIZING SCHEMA-CONFORMANT OBJECT MODELS

CROSS-REFERENCE TO RELATED APPLICATIONS

This application claims priority to U.S. Provisional Patent Application No. 63/699,107, entitled "AUTOMATED SYSTEM FOR STANDARDIZING DESIGN AND CONSTRUCTION FOR RESIDENTIAL HOMES," filed on Sep. 25, 2024, the entire disclosure of which is incorporated herein by reference in its entirety.

FIELD OF THE ART

The systems and methods disclosed herein relate generally to computer-implemented data processing and, more specifically, to systems and methods for generating and optimizing schema-conformant object models using constraint-based rule sets.

BACKGROUND

Discussion of the State of the Art

Computing systems that process spatial or architectural data frequently ingest heterogeneous data representations that vary in structure, encoding, and quality. These data representations may include narrative constraint rules, dimensional surveys, zoning specifications, environmental datasets, or graphical layouts. Conventional approaches to handling such data often require manual interpretation, static rule mapping, and ad hoc formatting adjustments, which are computationally inefficient, error-prone, and unable to scale effectively across diverse data sources.

Existing automated systems for architectural modeling frequently rely on predefined templates, fixed parameter sets, or rigid geometry kernels. These approaches require significant manual intervention to accommodate evolving spatial rules or jurisdiction-specific requirements and are unable to adapt when constraint definitions change. For instance, many conventional systems apply static bounding-box checks or predefined adjacency templates, which fail when constraint rules shift across projects or jurisdictions.

Another technical limitation of conventional processing systems is the inability to transform heterogeneous inputs into schema-conformant object models. Without a structured representation that encodes spatial relationships, dimensional dependencies, and constraint conditions in a machine-interpretable form, other processes remain fragmented. Outputs often consist of visual renderings or informal layouts that cannot support automated validation, iterative modification, or quantitative evaluation.

Conventional systems also lack mechanisms for iterative candidate generation and optimization under multiple constraints. When rules governing spatial compliance evolve, existing systems must be manually reconfigured, introducing delays and errors. They further lack dynamic evaluation strategies, resulting in inaccurate assessments when efficiency metrics, material utilization, and staffing requirements must be balanced simultaneously.

In addition, automated systems often fail to provide effective validation against constraint sets originating from unstructured sources. Static validation scripts cannot reliably account for cross-referential rules, interdependent spatial conditions, or overlapping constraint provisions, producing models that are incomplete or inconsistent with required standards.

Furthermore, conventional systems generally lack robust mechanisms for producing optimized schema-conformant outputs suitable for technical planning. Logging of intermediate transformations is often incomplete, preventing reliable audit trails or defensible verification of how input data was transformed into final models.

Accordingly, there remains a need for computer-implemented systems that are capable of processing heterogeneous data inputs, transforming unstructured information into machine-interpretable formats, and supporting validation and optimization without requiring extensive manual intervention.

SUMMARY

Systems and methods in accordance with various embodiments of the present disclosure address limitations in conventional computing approaches to spatial modeling and constraint processing. The disclosed embodiments describe obtaining heterogeneous inputs in multiple data formats, parsing and transforming them into structured rule sets, generating schema-conformant object representations that encode spatial relationships and constraint conditions, applying constraint resolution logic during model generation, iteratively producing candidate object models, evaluating candidate models using quantitative performance metrics, and generating optimized object models suitable for technical applications. These operations enable structured, machine-executed generation and optimization of spatial object models without reliance on manual interpretation or static templates.

The system obtains heterogeneous input data from a plurality of sources. Heterogeneous input data encompasses records that vary in format, structure, and encoding, including structured formats such as JSON or CSV, semi-structured formats such as XML or layered PDFs, and unstructured formats such as narrative text or graphical layouts. The plurality of sources may include dimensional surveys, zoning specifications, environmental datasets, or material references. For example, input data may include a zoning ordinance provided as a PDF, a dimensional survey captured as a tabular file, or an environmental dataset retrieved from an external data feed. The system applies parsing and recognition logic to extract tokens, fields, and attributes, which are normalized into schema-conformant rule sets.

The structured rule sets define spatial relationships and constraint conditions in a machine-interpretable form. Constraint profiles may specify dimensional limits, adjacency requirements, or material dependencies, and may be generated by tokenizing unstructured inputs, applying grammar-based parsing, and mapping extracted elements into schema-conformant constraint objects. These profiles enable machine-executed enforcement of constraints without manual re-entry or static bounding templates.

Based on the structured rule sets, the system generates schema-conformant object representations. The object representations encode spatial components as parametric assemblies and capture adjacency relationships in a graph-based structure. Nodes in the graph may represent wall, floor, or service assemblies, while edges define dimensional and relational dependencies between components. Assembly attributes, including dimensional parameters and material properties, are encoded in accordance with the structured rule sets, producing an object representation that is both schema-conformant and machine-interpretable.

The system applies constraint resolution logic to the object representation to enforce compliance during model generation. Constraint resolution logic may include propagating dimensional limits across adjacency relationships, resolving conflicts between overlapping assemblies, and verifying compliance against encoded constraint profiles. These operations ensure that constraint conditions are enforced throughout the generative process, rather than as post-hoc checks.

In certain embodiments, constraint conditions include both rule-based provisions derived from input data and user preference constraints received via configuration payloads. Configuration payloads may specify user selections or preference parameters, which are translated into constraint objects and combined with structured rule sets to influence the arrangement, sizing, or adjacency of parametric assemblies during model generation.

Candidate object models are generated by iteratively modifying the object representation. Iterative modifications may include reconfiguring adjacency graphs, adjusting parametric attributes, or regenerating assemblies under the structured rule sets. The iterative process produces multiple candidate models that explore alternative spatial configurations while maintaining compliance with the encoded constraints.

The system computes performance values for the candidate object models using machine-executed evaluation logic. Performance values quantify spatial efficiency, constraint compliance, or material usage, and may be calculated by analyzing circulation paths, applying rule-based validation logic, and evaluating material requirements from assembly attributes. The performance values are used to rank candidate models according to objective, machine-interpretable criteria.

An optimized object model is generated based on the computed performance values. The system may rank candidate models and select a model with a highest performance value, or apply multi-factor weighting strategies to balance efficiency, compliance, and material utilization. The optimized model represents a constraint-compliant and quantitatively evaluated configuration that reflects both encoded rule sets and user preference constraints.

The optimized object model may be processed into project plans comprising technical drawings, bill-of-materials, and construction scheduling data. Project plans generated from schema-conformant models maintain consistency with the structured rule sets and performance evaluations, ensuring that the resulting artifacts remain aligned with constraint conditions and spatial relationships.

As used herein, the term "heterogeneous input data" refers to information received in structured, semi-structured, or unstructured formats, including zoning texts, dimensional surveys, tabular datasets, environmental records, and graphical layouts. The term "structured rule set" refers to schema-conformant constraint objects that encode spatial relationships, dimensional dependencies, and material attributes in a machine-interpretable format. The term "schema-conformant object representation" refers to a graph-based model comprising parametric assemblies and adjacency relationships generated under the structured rule set. The term "candidate object models" refers to iteratively modified object representations that are evaluated against performance metrics. The term "performance values" refers to computed, quantitative scores that measure spatial efficiency, constraint compliance, and material usage, used for ranking and optimization. The term "configuration payload" refers to structured data comprising user selections or preference parameters translated into constraint objects for integration with rule-based conditions.

Although described in connection with architectural modeling and spatial optimization, the disclosed systems and methods may be adapted for use in technical domains such as logistics planning, manufacturing layout optimization, or resource allocation, where schema-conformant object models are generated and optimized under evolving constraint conditions.

Various other functions and advantages are described and suggested below as may be provided in accordance with the various embodiments.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
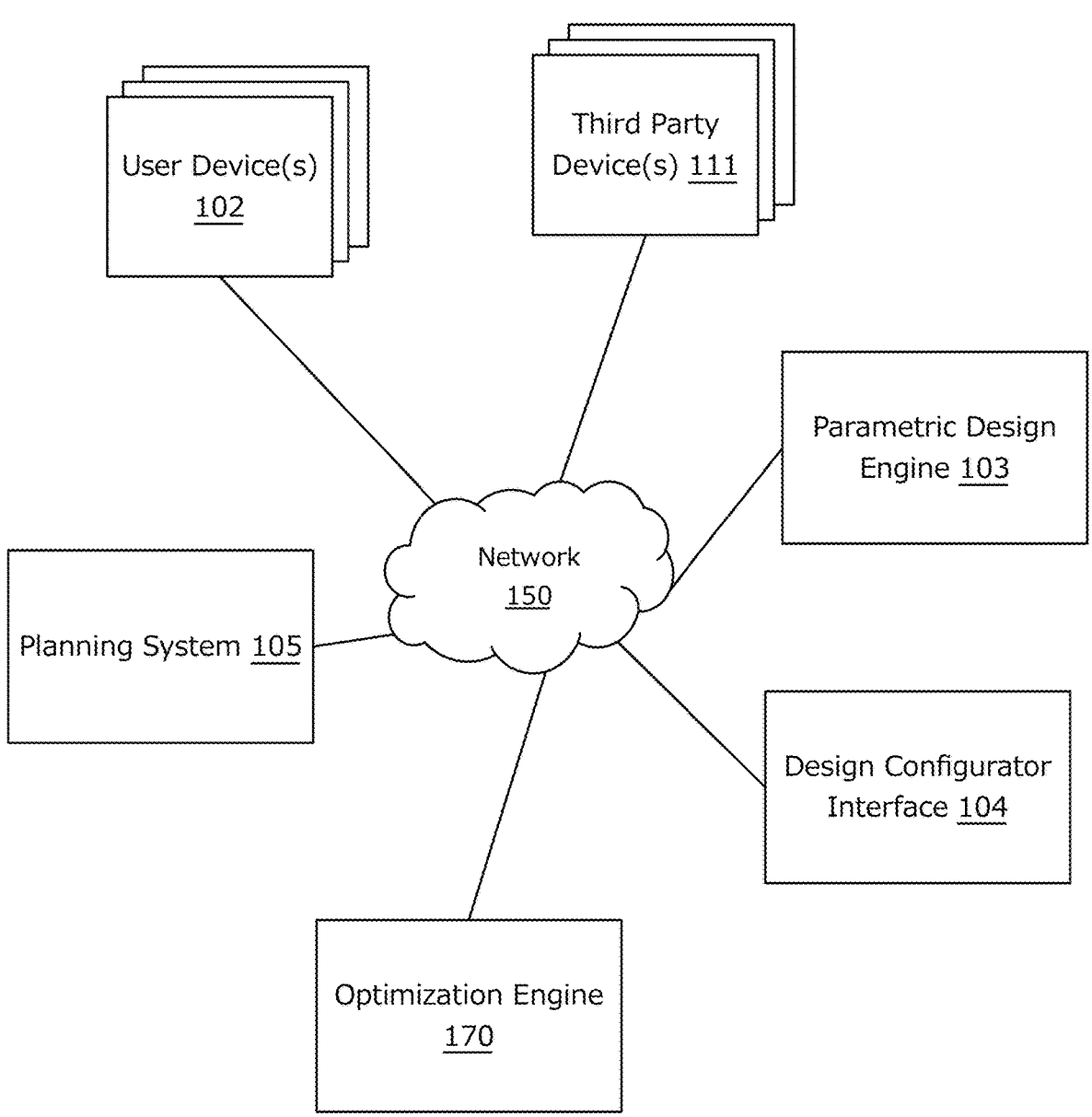
FIG. 1 illustrates an example architecture of a computing system for generating and optimizing schema-conformant object models, in accordance with various embodiments.

The embodiments described herein relate to systems and methods for generating and optimizing schema-conformant object models using constraint-based rule sets. The computing system is operable to obtain heterogeneous input data from a plurality of sources, process unstructured and semi-structured content using machine-executed parsing logic, derive structured rule sets that define spatial relationships and constraint conditions, generate schema-conformant object representations comprising parametric assemblies of spatial components, and apply constraint resolution logic to enforce compliance during model generation. In various embodiments, the computing system includes a parametric design engine operable to perform input parsing, rule derivation, object representation generation, and constraint application, and an optimization engine operable to perform iterative candidate generation, performance evaluation, and optimized model selection. The computing system further includes interface modules for communicating with user devices, third-party data sources, and planning systems, and may store data in component libraries, regulatory repositories, or site context databases. In certain embodiments, the computing system operates within a distributed computing environment and communicates over a shared network with external systems and data sources, supporting scalable ingestion, schema-conformant object model generation, and iterative optimization under multiple constraint conditions.

In certain embodiments, the disclosed systems and methods may be applied within residential design and planning workflows. For example, heterogeneous inputs may include zoning rules provided as text documents, dimensional surveys captured as spreadsheets, environmental data retrieved from external feeds, and material specifications stored in vendor catalogs. These inputs are processed into structured rule sets that define spatial constraints and dimensional relationships. The system generates object representations of proposed buildings, including parametric assemblies such as walls, floors, and service elements, and applies constraint conditions to ensure compliance with zoning and regulatory rules during generation. Iterative optimization may evaluate multiple candidate layouts against efficiency measures, material usage, and constraint compliance. While residential design represents one application domain, the underlying functions—parsing heterogeneous inputs, generating schema-conformant object models, applying constraint resolution, and optimizing under performance metrics—are broadly applicable to other spatial modeling and planning contexts.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Network Architecture

FIG. 1 illustrates an example architecture of a computing system for generating and optimizing schema-conformant object models, in accordance with various embodiments. It should be understood that reference numbers are carried over between figures for similar components for purposes of simplicity of explanation, but such usage should not be construed as a limitation on the various embodiments unless otherwise stated.

As shown, the computing system includes user device(s) 102, third party device(s) 111, parametric design engine 103, design configurator interface 104, optimization engine 170, planning system 105, and a network 150 over which the various systems and devices communicate and interact. The various components described herein are exemplary and may be implemented in combination, subdivision, or consolidation across one or more computing devices or servers, as would be understood by a person of ordinary skill in the art, without departing from the scope of the invention. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

User device(s) 102 are operable to communicate over network 150 and interact with parametric design engine 103, optimization engine 170, and planning system 105. More specifically, user device(s) 102 are operable to transmit heterogeneous input data, initiate processing instructions, and receive structured outputs including object representations, evaluation results, or project planning artifacts.

For example, user device(s) 102 may comprise desktop computers, laptops, tablets, smartphones, or servers executing applications capable of transmitting multi-format data representations and visualizing schema-conformant object models. In certain embodiments, user device(s) 102 are employed by customers to provide design preferences, review candidate object models, and interactively generate plans through design configurator interface 104. In other embodiments, user device(s) 102 are employed by contractors or professionals to access optimized models, technical drawings, or bill-of-materials generated by planning system 105.

User device(s) 102 may execute locally installed applications or browser-based clients operable to upload unstructured zoning rules, dimensional surveys, or material specifications; to display constraint-enforced object models; and to transmit reviewer interactions or corrections to parametric design engine 103 for adaptive refinement. Any number of user device(s) 102 may be employed, and such devices may be distributed, cloud-hosted, or geographically dispersed, while operating synchronously or asynchronously with other system components.

Third party device(s) 111 are operable to communicate over network 150 and provide external data inputs to parametric design engine 103 and optimization engine 170. More specifically, third party device(s) 111 are operable to transmit or expose data including regulatory rules, material specifications, environmental datasets, or dimensional survey records that supplement the heterogeneous input data obtained from user device(s) 102.

For example, third party device(s) 111 may comprise servers hosting regulatory databases, vendor catalog systems providing material attributes, or municipal repositories distributing zoning and environmental data. A third party device 111 may execute application programming interfaces operable to deliver structured, semi-structured, or unstructured data representations. In certain embodiments, external data may also be acquired through automated scraping of publicly available resources, bulk data downloads, scheduled synchronization pipelines, or direct sensor feeds. These acquisition methods enable parametric design engine 103 to obtain diverse input streams without requiring manual collection.

In certain embodiments, third party device(s) 111 incorporate hardware, software, or embedded logic that facilitates automated exchange of external data with the computing system. These devices may be geographically distributed, operated by independent entities, or deployed in cloud environments, and may interact asynchronously with user device(s) 102 to update constraint data, material specifications, or environmental attributes. Accordingly, in accordance with various embodiments, third party device(s) 111 can function as external sources of heterogeneous input data, obtained through scraping, synchronization, or direct query, to expand and refine the information available to parametric design engine 103 and optimization engine 170.

Parametric design engine 103 is operable to transform heterogeneous input data into schema-conformant object models that encode spatial relationships and constraint conditions. More specifically, parametric design engine 103 is operable to parse inputs from user device(s) 102 and third party device(s) 111, derive structured rule sets from unstructured or semi-structured data, and generate object models that capture parametric assemblies and adjacency relationships in a machine-interpretable form. Parametric design engine 103 is further described in FIG. 2.

For example, parametric design engine 103 may receive dimensional surveys, zoning provisions, and environmental attributes in multiple data formats, process these heterogeneous inputs into structured constraint profiles, and generate object models that reflect dimensional limits, adjacency conditions, and material attributes. These object models are schema-conformant, that is, they align with defined schema attributes and are suitable for other processing.

In certain embodiments, parametric design engine 103 is operable to apply constraint conditions during object model generation so that compliance is enforced as models are constructed, rather than after generation. Parametric design engine 103 may further provide interfaces to optimization engine 170 for iterative candidate generation, and to planning system 105 for production of technical plans.

Optimization engine 170 is operable to generate, evaluate, and refine candidate object models based on constraint conditions and quantitative performance metrics. More specifically, optimization engine 170 is operable to apply constraint resolution logic to schema-conformant object models produced by parametric design engine 103, generate multiple candidate variations through iterative modification, compute performance values for the generated candidates, and select an optimized object model according to the computed performance values. Optimization engine 170 is further described in FIG. 3.

For example, optimization engine 170 may receive a schema-conformant object model that encodes spatial relationships, adjacency conditions, and dimensional dependencies. The engine may generate candidate variations by modifying parametric assemblies, adjusting adjacency relationships, or reconfiguring dimensional attributes, while maintaining compliance with constraint profiles. Performance values may be computed to quantify spatial efficiency, material usage, or compliance levels, and an optimized object model may be selected based on these quantitative results.

In certain embodiments, optimization engine 170 operates iteratively by generating multiple candidate object models, applying constraint checks to each, and ranking the candidates according to computed performance values. Optimization engine 170 may select a highest-ranked candidate model or apply threshold criteria to identify one or more models that satisfy required performance levels. Optimization engine 170 may interface with planning system 105 to deliver optimized object models for conversion into technical project plans, and with parametric design engine 103 to receive updated rule sets or schema mappings. As described in FIG. 3, optimization engine 170 functions as the system's analytical and evaluative layer, transforming constraint-enforced object models into optimized configurations suitable for further processing.

In certain embodiments, optimization engine 170 may interface with an optimization engine interface of parametric design engine 103 to receive schema-conformant object representations and prepare them for optimization. Optimization engine 170 may incorporate a layout optimizer operable to refine spatial arrangements using rule-based heuristics or machine learning models trained to recognize patterns of spatial efficiency and regulatory compliance. Optimization engine 170 may further include a performance tracker operable to compute and maintain metrics such as total floor area, adjacency conformity, or circulation efficiency across candidate models. In some implementations, optimization engine 170 may include anomaly handling logic operable to detect unexpected or non-standard layouts and generate modified alternatives that satisfy user requirements or regulatory conditions. Data exchanges between parametric design engine 103 and optimization engine 170 may occur over network 150, or through direct wired or wireless connections, as appropriate for system deployment.

Planning system 105 is operable to convert schema-conformant object models generated by parametric design engine 103 and optimized by optimization engine 170 into structured technical planning artifacts. More specifically, planning system 105 is operable to integrate constraint profiles, regulatory data, and site-specific context into generated models and produce project plans comprising technical drawings, bill-of-materials, installation instructions, and scheduling data.

In various embodiments, planning system 105 includes a formatting and translation module operable to encode spatial assemblies, dimensional attributes, and metadata into standardized representations suitable for use by external planning or construction systems. These representations may include annotated 2D and 3D technical drawings, structured material schedules, and dependency-based task sequences for construction trades.

For example, planning system 105 may generate permit-ready construction documents that annotate zoning offsets, accessibility provisions, or fire safety separations. It may further generate visual representations of the construction site, incorporating topographical details, existing structures, and natural features, as well as adjacent properties and potential obstructions. Planning system 105 may use data retrieved from a site context database to produce such comprehensive representations, ensuring that technical plans reflect spatial and environmental constraints in addition to regulatory requirements.

In certain embodiments, planning system 105 includes a delivery interface operable to determine where and how generated project plans are transmitted or persisted. Project plans may be delivered to user device(s) 102 for review, to third party device(s) 111 for regulatory submission, or stored for archival and subsequent retrieval. Accordingly, in accordance with various embodiments, planning system 105 may append metadata indicating applied constraints, optimization scores, or generation conditions, thereby preserving verifiable lineage of the planning outputs.

Network 150 is operable to provide communication pathways between user device(s) 102, third party device(s) 111, parametric design engine 103, optimization engine 170, and planning system 105. More specifically, network 150 is operable to transmit heterogeneous input data, schema-conformant object models, optimization results, and technical planning artifacts among the system components for processing and delivery.

For example, network 150 may include an intranet, extranet, virtual private network (VPN), local area network (LAN), wireless LAN (WLAN), wide area network (WAN), metropolitan area network (MAN), or a portion of the Internet. Network 150 may also include combinations of two or more such networks depending on deployment context. Links coupling system components to network 150 may be wired, wireless, or optical, and may support synchronous or asynchronous communication among distributed devices and engines.

In certain embodiments, network 150 is operable to support secure data exchange between user-facing devices and system components, enabling transmission of multi-format data representations and reception of structured object models or project plans. Network 150 may further facilitate communication between optimization engine 170 and planning system 105 for delivery of optimized object models, and between third party device(s) 111 and parametric design engine 103 for ingestion of external regulatory, environmental, or material data sources.

In particular embodiments, each system, component, or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Accordingly, in accordance with various embodiments, the described computing system provides a technical solution to the problem of processing and integrating heterogeneous data from disparate computing sources. By transforming unstructured and semi-structured data into structured rule sets, the system enables the generation of schema-conformant object models that are machine-interpretable and constraint-enforced. For example, the system may integrate dimensional surveys, zoning provisions, and environmental datasets into a unified object representation, where spatial relationships, adjacency rules, and dimensional parameters are encoded as structured constraint objects. This transformation process addresses the technical problem of inconsistent and unstructured inputs by generating standardized, schema-conformant models that can be validated, iteratively optimized, and quantitatively evaluated by computing logic. The ability to apply constraint resolution and performance evaluation during model generation improves the functioning of the computer by enabling automated creation of structured object models that were not computable through manual or template-based methods.

Parametric Design Engine

Figure 2:
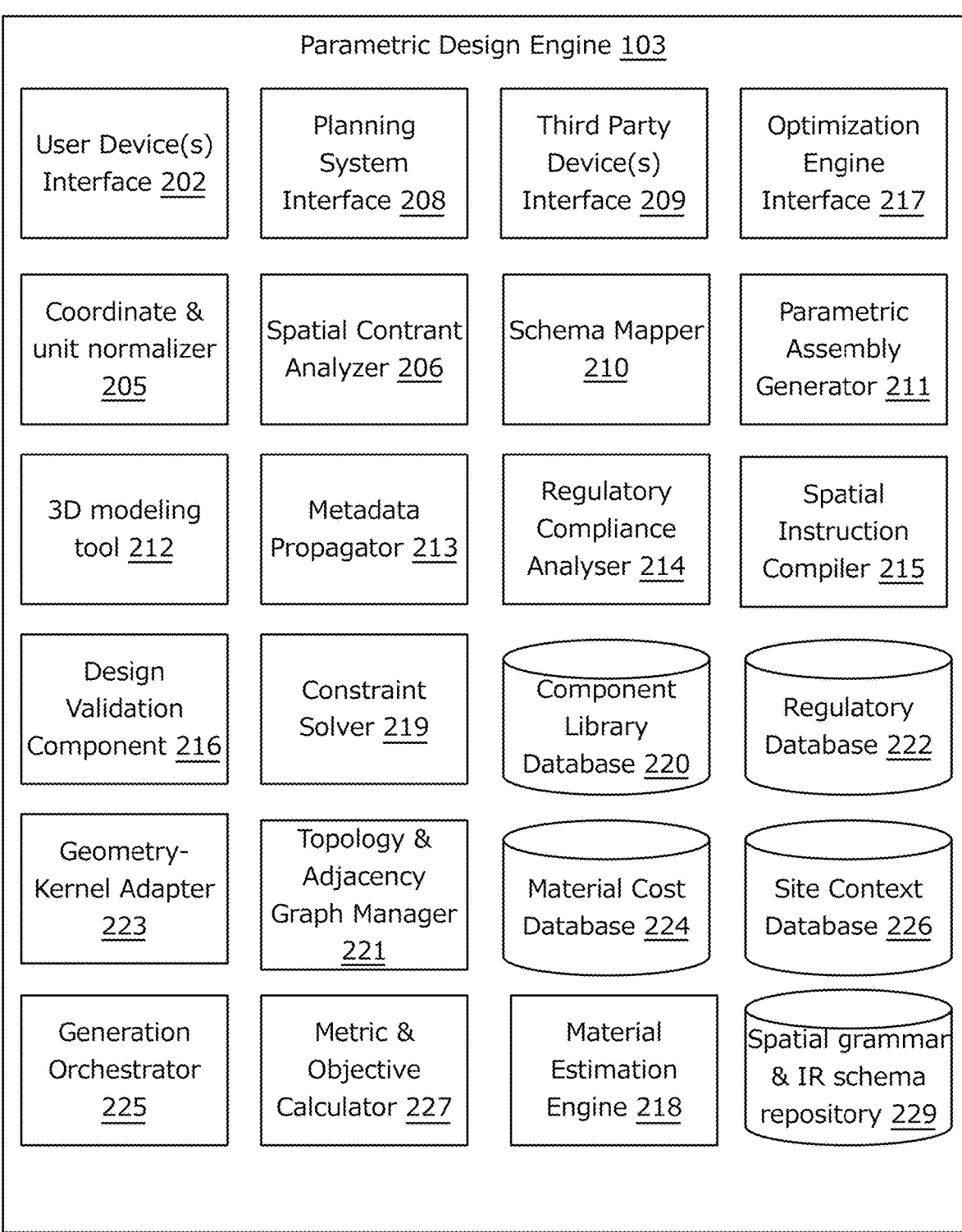
FIG. 2 illustrates an example configuration of a parametric design engine, in accordance with various embodiments.

FIG. 2 illustrates an example architecture of the parametric design engine 103 in accordance with various embodiments. The various components described herein are exemplary and for illustration purposes only. As shown, parametric design engine 103 comprises user device(s) interface 202, planning system interface 208, third-party device(s) interface 209, and optimization engine interface 217. Parametric design engine 103 further comprises coordinate and unit normalizer 205, spatial constraint analyzer 206, schema mapper 210, parametric assembly generator 211, 3D modeling tool 212, metadata propagator 213, regulatory compliance analyzer 214, spatial instruction compiler 215, design validation component 216, constraint solver 219, material estimation module 218, geometry-kernel adapter 223, topology and adjacency graph manager 221, generation orchestrator 225, and metric and objective calculator 227. Parametric design engine 103 may also include or be in communication with one or more databases, including component library database 220, regulatory database 222, material cost database 224, site context database 226, and spatial grammar and intermediate representation schema repository 229. Other system configurations may be used, as would be understood by a person of ordinary skill in the art, without departing from the scope of the invention.

It should be noted that although the databases are shown as separate databases, data from the databases can be maintained across fewer or additional databases. The databases can be accessed by each of the various components in order to perform the functionality of the corresponding component. Other components, systems, services, etc. may access the databases. Although parametric design engine 103 is shown as a single system, the system may be hosted on multiple server computers and/or distributed across multiple systems. Additionally, the components may be performed by any number of different computers and/or systems. Thus, the components may be separated into multiple services and/or over multiple disparate systems to perform the functionality described herein.

User device(s) interface 202 is operable to facilitate interaction between user device(s) 102 and parametric design engine 103. More specifically, user device(s) interface 202 is operable to receive user-supplied preferences and constraints, including dimensional targets, adjacency requirements, program elements, and evaluation weights, and to provide generated object models and associated performance values back to user device(s) 102 for review.

In one embodiment, user device(s) interface 202 receives inputs through a browser-based client or mobile application, where a user may specify desired room counts, minimum spacing offsets, circulation preferences, or weighting factors for optimization. User device(s) interface 202 may validate parameter ranges, normalize timestamps, and register inputs with identifiers to ensure consistent application within parametric design engine 103 and optimization engine 170.

User device(s) interface 202 is further operable to transmit status updates and visualization artifacts produced by parametric design engine 103 and optimization engine 170. These outputs may include previews of schema-conformant object models, side-by-side candidate comparisons, or ranked performance metrics. In certain embodiments, user device(s) interface 202 may capture user review actions— such as approving a candidate model, adjusting constraint weights, or requesting regeneration—and register these actions for iterative processing.

As described in FIG. 2, heterogeneous unstructured data is obtained from third party device(s) interface 209 and processed within parametric design engine 103 into schema-conformant object models. User device(s) interface 202 operates in parallel with design configurator interface 104 to incorporate user preferences, selections, and review inputs into these models, ensuring that customer-directed or contractor-directed requirements are integrated into the optimization and planning workflows.

Third party device(s) interface 209 is operable to receive, normalize, and coordinate heterogeneous data inputs from third party device(s) 111 for use by parametric design engine 103. In various embodiments, third party device(s) interface 209 supports ingestion of multi-format records including zoning provisions, dimensional surveys, environmental datasets, and material catalogs. More specifically, third party device(s) interface 209 enables structured delivery of heterogeneous inputs into parametric design engine 103, allowing unstructured or semi-structured data to be parsed and transformed into schema-conformant rule sets.

In an embodiment, third party device(s) interface 209 may obtain zoning ordinances published as text documents, dimensional survey data encoded in spreadsheets, or environmental attributes retrieved from web-based data feeds. In certain embodiments, third party device(s) interface 209 may employ automated retrieval techniques such as bulk download, web scraping, scheduled synchronization pipelines, or direct sensor integration. The interface may validate incoming data streams, standardize file encodings, and register inputs with metadata tags indicating origin, timestamp, and format, ensuring consistent handling across parametric design engine 103.

For example, third party device(s) interface 209 may scrape municipal zoning databases to retrieve new setback regulations, download environmental records that include topographical or floodplain data, or import material specifications directly from vendor catalogs. Each dataset is packaged into a schema-conformant payload, annotated with contextual metadata, and queued for processing by schema mapping logic within parametric design engine 103.

In certain embodiments, third party device(s) interface 209 supports asynchronous communication with third party device(s) 111, enabling data acquisition in real time or on scheduled intervals. The interface may incorporate deduplication and integrity-checking protocols to prevent redundant ingestion or corrupted payloads. Third party device(s) interface 209 may further provide lineage records that track how external datasets were retrieved, normalized, and registered, allowing parametric design engine 103 to maintain traceability when generating schema-conformant object models.

Planning system interface 208 is operable to transmit schema-conformant object models and associated metadata from parametric design engine 103 to planning system 105. More specifically, planning system interface 208 is operable to package optimized or validated object representations, apply formatting and translation logic, and deliver them in a structured form that can be consumed by planning system 105 to generate technical drawings, material schedules, and work packages.

In an embodiment, planning system interface 208 may transform parametric assemblies, adjacency graphs, and constraint profiles into structured payloads encoded in schema-conformant formats such as JSON, XML, or IFC. Each payload may include dimensional attributes, material identifiers, compliance annotations, and metadata tags describing model lineage. Planning system interface 208 may also validate payload integrity prior to transmission by applying checksum verification, schema validation, or timestamp synchronization to ensure compatibility with planning system 105.

For example, planning system interface 208 may transmit an object model comprising wall, floor, and service assemblies annotated with regulatory offsets and adjacency relationships, along with a material usage table and circulation efficiency metrics. These structured outputs may be queued to planning system 105 for generation of permit-ready technical drawings, bill-of-materials, and construction task sequences. In certain embodiments, planning system interface 208 may also include scheduling metadata that encodes dependency relationships between assemblies, enabling planning system 105 to derive resource allocation plans.

In certain embodiments, planning system interface 208 supports both synchronous and asynchronous transmission modes, allowing object models to be pushed to planning system 105 in real time during iterative optimization or batched for delivery upon completion of constraint validation. Planning system interface 208 may further support bidirectional acknowledgment, where planning system 105 returns status signals or error codes that confirm successful payload registration or request retransmission. Accordingly, in accordance with various embodiments planning system interface 208 can help ensure that schema-conformant object models generated by parametric design engine 103 are consistently and verifiably transferred for use in technical planning workflows.

Optimization engine interface 217 is operable to coordinate the transfer of schema-conformant object representations from parametric design engine 103 to optimization engine 170. More specifically, optimization engine interface

217 is operable to serialize object representations and structured rule sets, validate their integrity, and prepare them for iterative processing by optimization engine 170. The interface ensures that object assemblies, constraint profiles, and metadata fields are preserved in a consistent format to support optimization cycles without data loss or ambiguity.

More specifically, optimization engine interface 217 performs (1) payload construction by packaging assemblies, adjacency graphs, and constraint conditions into a structured representation, (2) schema validation by confirming that the payload aligns with predefined schema attributes, and (3) lineage tagging by appending session identifiers, timestamps, and origin markers to track the provenance of the transmitted model. An adjacency graph, as used herein, is a graph-based data structure in which nodes represent parametric assemblies such as walls, floors, or service elements, and edges represent dimensional or relational dependencies among the assemblies.

For example, optimization engine interface 217 may generate a payload containing a building layout object representation, including wall assemblies annotated with dimensional limits, setback rules encoded as constraint objects, and metadata describing the survey source. This payload is validated against schema attributes, assigned a processing identifier, and transmitted to optimization engine 170, which then generates candidate object models by modifying assemblies and evaluating them against the provided constraints.

In certain embodiments, optimization engine interface 217 supports both synchronous and asynchronous communication modes. In synchronous mode, parametric design engine 103 transmits object representations immediately upon model generation, enabling optimization engine 170 to begin evaluation without delay. In asynchronous mode, payloads may be queued and transmitted in batches based on scheduling logic. Optimization engine interface 217 may also support bidirectional acknowledgments, wherein optimization engine 170 returns confirmation signals, error codes, or performance summaries that are logged back into parametric design engine 103 for traceability.

In accordance with various embodiments, optimization engine interface 217 provides a technical mechanism for ensuring that structured object models generated by parametric design engine 103 are consistently validated, serialized, and transmitted to optimization engine 170 for iterative candidate generation and performance evaluation. Additional details of optimization engine are described in FIG. 3 below.

Coordinate & unit normalizer 205 is operable to standardize spatial inputs into a consistent coordinate system and unit representation prior to constraint analysis. More specifically, coordinate & unit normalizer 205 is operable to align heterogeneous input datasets expressed in varying coordinate frames, measurement systems, or scaling conventions into a unified spatial reference model.

In certain embodiments, coordinate & unit normalizer 205 performs axis alignment by transforming local coordinate systems into a global frame, applies unit normalization by converting between metric and imperial measurements, and performs scale correction when inputs include distorted or inconsistent drawing proportions. A unified spatial reference model, as used herein, refers to a structured data framework where positional values, dimensional parameters, and orientation vectors are expressed in a common coordinate system and unit standard.

In an embodiment, coordinate & unit normalizer 205 receives a survey file encoded in feet and inches, a zoning dataset encoded in meters, and a CAD drawing where the scale factor is inconsistent with the stated dimensions. The component converts all values into a uniform metric unit, reprojects the survey coordinates into a common frame of reference, and reconciles the CAD drawing scale to ensure dimensional consistency across datasets.

In accordance with various embodiments, coordinate & unit normalizer 205 interfaces with schema mapper 210 to register normalized values into schema-conformant fields and with spatial constraint analyzer 206 to provide corrected dimensional baselines for constraint derivation. Metadata tags may be propagated to retain original measurement units and coordinate references for traceability and audit purposes.

Spatial constraint analyzer 206 is operable to derive machine-readable constraint conditions from normalized spatial data. More specifically, spatial constraint analyzer 206 is operable to interpret dimensional limits, adjacency rules, and regulatory conditions expressed in structured or semi-structured input, and encode those conditions into a structured rule set that governs permissible object model configurations.

In certain embodiments, spatial constraint analyzer 206 parses dimensional parameters such as maximum building height, minimum corridor width, or setback distance, and transforms them into constraint objects represented as schema-conformant fields. Constraint objects, as used herein, are structured data records that define allowable ranges, relational dependencies, or exclusionary conditions applicable to parametric assemblies.

In an embodiment, spatial constraint analyzer 206 receives input describing a zoning requirement that limits total floor-area ratio. The component derives a proportional constraint object, encodes it as a rule node in the structured rule set, and associates it with building footprint and height attributes. Similarly, a fire safety regulation requiring dual means of egress is converted into adjacency constraints that govern circulation assemblies.

In accordance with various embodiments, spatial constraint analyzer 206 coordinates with schema mapper 210 to ensure that parsed constraints are consistently registered with schema attributes and with parametric assembly generator 211 to propagate constraint conditions into assembly instantiation. Constraint propagation may include assigning rule identifiers to affected assemblies, tracking constraint satisfaction states, and updating conflict markers when multiple conditions overlap.

Schema mapper 210 is operable to align parsed spatial attributes and constraint objects into a schema-conformant representation. More specifically, schema mapper 210 is operable to register heterogeneous data fields against predefined schema slots, enforce consistency across dimensional and relational attributes, and generate a structured rule set compatible with subsequent object model generation.

In certain embodiments, schema mapper 210 performs attribute normalization by resolving naming conflicts between data sources, value standardization by converting heterogeneous encodings into uniform schema types, and relationship mapping by assigning adjacency or dependency links between schema attributes. A schema-conformant representation, as used herein, is a structured data model in which spatial and constraint attributes are encoded in alignment with a predefined schema specification that can be applied uniformly across object model components.

In an embodiment, schema mapper 210 receives survey data expressed in multiple notations, such as "corridor width" and "hallway width," and maps both to a unified schema attribute defining circulation width. Schema mapper 210 may also receive overlapping dimensional values from zoning data and environmental records, reconcile discrepancies according to priority rules, and encode the reconciled values into schema fields.

In accordance with various embodiments, schema mapper 210 coordinates with metadata propagator 213 to preserve lineage identifiers across mapped attributes and with parametric assembly generator 211 to provide schema-aligned inputs for parametric instantiation. Mapping operations may include assigning origin identifiers, timestamp fields, and jurisdictional tags to each schema attribute to ensure traceability throughout model generation and optimization.

Parametric assembly generator 211 is operable to construct schema-conformant object models composed of parametric assemblies based on mapped attributes and constraint objects. More specifically, parametric assembly generator 211 is operable to instantiate assemblies as parameterized components, apply rule sets that govern their geometry and relationships, and maintain adjacency structures that define spatial interactions.

In certain embodiments, parametric assembly generator 211 generates assemblies representing walls, floors, corridors, or service elements, each encoded with adjustable parameters such as dimensional attributes, material types, or connection points. Parametric assemblies, as used herein, are computational objects whose structural properties are defined by modifiable parameters rather than fixed geometry, enabling automatic reconfiguration in response to constraint enforcement.

In an embodiment, parametric assembly generator 211 constructs a room assembly by applying a minimum circulation width constraint received from spatial constraint analyzer 206, assigns adjacency links to connect the room assembly with corridor assemblies, and encodes attributes such as usable area and load-bearing classification. Subsequent modification of the circulation width parameter automatically propagates dimensional adjustments across connected assemblies without requiring manual redesign.

In accordance with various embodiments, parametric assembly generator 211 coordinates with 3D modeling tool 212 to produce geometric renderings of assemblies and with design validation component 216 to confirm assembly compliance with the structured rule set. Parametric assembly generator 211 may also transmit assembly metadata to metadata propagator 213, ensuring that origin identifiers, constraint satisfaction states, and adjacency references are preserved for later validation and optimization.

3D modeling tool 212 is operable to generate geometric visualizations of parametric assemblies defined within the object model. More specifically, 3D modeling tool 212 is operable to render assemblies into spatially accurate three-dimensional structures, apply geometric kernels to maintain model integrity, and output visualization data suitable for design review, validation, or integration with planning system 105.

In certain embodiments, 3D modeling tool 212 receives parametric assemblies from parametric assembly generator 211 and applies geometric transformations that instantiate surfaces, volumes, and adjacency relationships into a three-dimensional coordinate system. The tool may generate meshes, solid bodies, or hybrid geometric forms, depending on assembly attributes and schema specifications. A geometric kernel, as used herein, refers to the computational foundation that supports precise surface generation, Boolean operations, and topological consistency checks across assemblies.

In an embodiment, 3D modeling tool 212 receives a corridor assembly parameterized by width, length, and circulation type, and constructs a three-dimensional extrusion that incorporates adjacency relationships to room assemblies. Modifications to corridor width propagate through the parametric assembly, and the rendered 3D geometry updates automatically to reflect the adjusted parameters while preserving topological integrity.

In accordance with various embodiments, 3D modeling tool 212 coordinates with design validation component 216 to ensure that rendered geometries comply with constraint conditions and with planning system 105 to supply geometric outputs for conversion into construction plans. 3D modeling tool 212 may also register mesh identifiers, surface attributes, and volumetric data with metadata propagator 213 to preserve lineage across the modeling process.

Metadata propagator 213 is operable to preserve and transmit contextual metadata across all stages of object model generation and optimization. More specifically, metadata propagator 213 is operable to attach source identifiers, timestamps, constraint satisfaction states, and lineage attributes to spatial components and assemblies, ensuring traceability of model transformations.

In certain embodiments, metadata propagator 213 associates each schema-mapped attribute and parametric assembly with origin identifiers derived from input datasets, records modification events triggered by constraint resolution or iterative optimization, and propagates compliance indicators across connected assemblies. Metadata, as used herein, refers to structured contextual information that describes the provenance, state, or validation status of a spatial attribute or assembly within the object model.

In an embodiment, metadata propagator 213 receives a wall assembly parameter with dimensional inputs sourced from a survey dataset, assigns a metadata tag that encodes the dataset identifier and measurement method, and propagates this tag through constraint adjustments applied by constraint solver 219. If the wall assembly is resized during optimization, metadata propagator 213 appends a modification record while preserving the original lineage reference.

In accordance with various embodiments, metadata propagator 213 coordinates with schema mapper 210 to retain attribute-level provenance during schema alignment, with parametric assembly generator 211 to register assembly identifiers, and with design validation component 216 to ensure that compliance verification is logged and traceable. Metadata propagator 213 may also supply lineage records to planning system 105, allowing technical plans to embed contextual references for audit and verification purposes.

Regulatory compliance analyzer 214 is operable to evaluate schema-conformant object models against constraint conditions derived from applicable rules and standards. More specifically, regulatory compliance analyzer 214 is operable to interpret encoded constraint objects, apply rule-based validation logic to parametric assemblies, and generate compliance indicators that classify assemblies as permissible, conditional, or non-compliant.

In certain embodiments, regulatory compliance analyzer 214 receives constraint objects from spatial constraint analyzer 206, applies schema mappings from schema mapper 210, and evaluates each parametric assembly instantiated by parametric assembly generator 211. Validation may include dimensional rule enforcement, adjacency verification, and regulatory cross-checking. A compliance indicator, as used herein, is a structured value associated with a parametric assembly that records whether the assembly satisfies, partially satisfies, or violates a given constraint condition.

In an embodiment, regulatory compliance analyzer 214 evaluates a circulation assembly against fire safety constraints requiring dual means of egress. The analyzer applies adjacency rules to confirm that the circulation assembly connects to multiple exits, records a compliance indicator if the requirement is satisfied, and appends a violation flag if the adjacency condition is not met.

In accordance with various embodiments, regulatory compliance analyzer 214 coordinates with design validation component 216 to ensure that flagged assemblies are logged for further inspection and with optimization engine 170 to supply compliance results used in model selection and ranking. Compliance metadata may also be transmitted to metadata propagator 213 to preserve traceability of validation outcomes across subsequent model iterations.

Spatial instruction compiler 215 is operable to convert schema-conformant object models into structured machine-readable instruction sets that encode spatial logic for computational processing. More specifically, spatial instruction compiler 215 is operable to interpret parametric assemblies, extract relational and dimensional constraints, and compile them into low-level instruction sequences that can be executed by geometry engines, constraint solvers, or optimization routines.

In certain embodiments, spatial instruction compiler 215 parses parametric assemblies generated by parametric assembly generator 211, identifies variable attributes such as adjacency relationships, dimensional tolerances, and constraint dependencies, and compiles these into intermediate representations expressed as rule-based instruction graphs. An instruction graph, as used herein, refers to a structured data model where nodes represent spatial elements and edges encode constraint enforcement operations, enabling systematic evaluation by machine-executed solvers.

In an embodiment, spatial instruction compiler 215 receives a room assembly with adjacency requirements specifying that it must connect to two circulation corridors. The compiler encodes these adjacency requirements into instruction nodes with conditional operators, producing a sequence of evaluation steps: (1) verify existence of corridor assemblies, (2) confirm bidirectional connectivity, and (3) enforce minimum dimensional width. The resulting instruction set may be executed by constraint solver 219, ensuring that compliance is enforced algorithmically rather than through manual review.

In accordance with various embodiments, spatial instruction compiler 215 generates multiple categories of instructions, including dimensional validation operators, adjacency propagation directives, and constraint satisfaction checks. These compiled instructions are stored in a structured schema and indexed by assembly identifier, allowing constraint solver 219 to retrieve and execute them deterministically. Instruction compilation may also include the generation of fallback branches for non-compliant assemblies, directing optimization engine 170 to modify specific parameters until compliance thresholds are satisfied.

In another embodiment, spatial instruction compiler 215 translates zoning requirements into rule sequences that define permissible floor-area ratios as mathematical inequalities. For example, a zoning constraint limiting maximum floor area to four times the lot area is compiled into an instruction sequence that retrieves lot dimensions from the normalized dataset, calculates allowable maximum square footage, and enforces the condition against aggregated room assemblies. This technical process ensures that spatial models are evaluated through executable computations rather than static template checks, providing a machine-implemented improvement over manual regulatory review.

In accordance with various embodiments, spatial instruction compiler 215 coordinates with metadata propagator 213 to attach lineage references to each compiled instruction and with geometry-kernel adapter 223 to format compiled instructions for execution in specific modeling environments. By generating structured, machine-executable instruction sets, spatial instruction compiler 215 ensures that spatial relationships and constraints are represented as computable logic, enabling automated compliance and optimization processes that could not be performed manually at scale.

Design validation component 216 is operable to evaluate schema-conformant object models against compiled spatial instructions and constraint conditions to ensure that generated assemblies satisfy technical requirements. More specifically, design validation component 216 is operable to execute machine-generated instruction sets, detect violations of dimensional or relational rules, and produce validation outputs that encode compliance status for each parametric assembly.

In certain embodiments, design validation component 216 receives compiled instruction graphs from spatial instruction compiler 215, retrieves constraint objects from spatial constraint analyzer 206, and applies rule execution logic to verify that assemblies generated by parametric assembly generator 211 conform to required specifications. Validation outputs, as used herein, refer to structured machine-readable records that record compliance indicators, violation flags, and supporting metrics for each evaluated assembly.

In an embodiment, design validation component 216 executes an instruction sequence that requires a residential unit assembly to include egress points connecting to circulation assemblies. The component traverses adjacency relationships, confirms presence of two corridor assemblies, and enforces dimensional width thresholds. If the traversal fails or the minimum width is not satisfied, design validation component 216 appends a violation flag to the corresponding assembly record. This validation process ensures that non-compliant designs are flagged algorithmically, independent of manual inspection.

In accordance with various embodiments, design validation component 216 performs iterative revalidation during optimization cycles. For example, when optimization engine 170 adjusts corridor widths or room dimensions, design validation component 216 re-executes relevant instruction sets to confirm that the modifications remain consistent with fire safety and zoning constraints. By performing iterative machine-based checks, the system eliminates delay associated with manual revalidation processes and ensures that constraint satisfaction is continuously enforced.

In another embodiment, design validation component 216 applies graph traversal logic to confirm circulation efficiency within multi-unit layouts. The component computes circulation paths across adjacency graphs, quantifies path lengths, and compares them against allowable thresholds encoded in the rule set. If circulation exceeds defined limits, validation outputs record the non-compliance and direct optimization engine 170 to generate alternative layouts with shorter paths. This demonstrates a technical improvement by encoding circulation logic as a computable validation routine rather than relying on static human analysis.

In accordance with various embodiments, design validation component 216 coordinates with metadata propagator 213 to preserve validation records with lineage references and with constraint solver 219 to supply violation data used for automated resolution. Accordingly, in accordance with various embodiments, design validation component 216 can provide a machine-executed verification mechanism that enforces compliance within object models, helping to ensure that spatial and constraint conditions are validated through structured computational logic.

Constraint solver 219 is operable to enforce structured rule sets on schema-conformant object models by applying machine-executed resolution logic to parametric assemblies. More specifically, constraint solver 219 is operable to identify conflicts between overlapping rules, propagate constraint values across adjacency relationships, and iteratively adjust assembly parameters until constraint satisfaction is achieved or violation states are recorded.

In certain embodiments, constraint solver 219 executes rule evaluation sequences compiled by spatial instruction compiler 215. These sequences encode dimensional thresholds, adjacency conditions, or proportional requirements as computable logic. Constraint solver 219 applies satisfiability solving techniques, graph-based propagation, and iterative refinement to enforce these conditions across assemblies. A satisfiability routine, as used herein, refers to a computational process that determines whether a set of constraint equations can be satisfied simultaneously, producing either a resolved assignment or a violation record.

In an embodiment, constraint solver 219 enforces a setback requirement parsed as a minimum distance between a building assembly and a property boundary. The solver propagates the distance rule across all relevant assemblies, detects violations where a wall assembly intrudes into the setback zone, and automatically repositions the assembly to restore compliance. If repositioning conflicts with a circulation width constraint, constraint solver 219 executes conflict resolution logic that evaluates rule priority and adjusts corridor dimensions accordingly.

In accordance with various embodiments, constraint solver 219 performs iterative propagation cycles to enforce interdependent constraints. For example, when a maximum floor-area ratio and a minimum corridor width are applied simultaneously, constraint solver 219 balances dimensional adjustments across multiple assemblies by distributing modifications proportionally until both conditions are satisfied. If no resolution is possible, constraint solver 219 appends a violation flag and transmits the failure state to design validation component 216 for recording.

In another embodiment, constraint solver 219 applies adjacency graph traversal to enforce circulation rules. The solver computes possible paths through room and corridor assemblies, identifies bottlenecks or dead-ends, and modifies adjacency relationships to maintain connectivity. These adjustments are performed algorithmically and reflected in updated object models without manual redrafting. This demonstrates a technical improvement in computer-executed spatial reasoning by enabling automated enforcement of circulation logic at a scale infeasible for manual methods.

In accordance with various embodiments, constraint solver 219 coordinates with optimization engine 170 to provide resolved models for performance evaluation and with metadata propagator 213 to preserve detailed lineage of constraint adjustments. Resolution states may be logged with identifiers that specify which constraints were enforced, which assemblies were modified, and whether conflicts were resolved or violations persisted.

Material estimation module 218 is operable to compute quantitative material requirements directly from schema-conformant object models. More specifically, material estimation module 218 is operable to extract dimensional attributes from parametric assemblies, apply schema-defined material mappings, and generate structured material usage outputs suitable for planning and cost modeling.

In certain embodiments, material estimation module 218 retrieves assembly attributes such as wall length, floor area, or roof pitch from parametric assembly generator 211, applies material mapping rules defined in schema mapper 210, and computes usage quantities expressed in standardized units. A material mapping rule, as used herein, refers to a structured association between an assembly attribute and a corresponding material consumption rate (e.g., square feet of drywall per square foot of wall surface).

In an embodiment, material estimation module 218 processes a wall assembly with attributes indicating a 12-foot length, 9-foot height, and drywall finish. The module calculates wall surface area, applies a material mapping rule defining drywall coverage per square foot, and produces a structured output specifying drywall sheets, joint compound quantities, and fastener counts. If the wall assembly includes additional metadata tags propagated from regulatory compliance analyzer 214 (e.g., fire-rating requirement), material estimation module 218 adjusts material types and quantities accordingly.

In accordance with various embodiments, material estimation module 218 also incorporates constraint-driven adjustments. For example, when constraint solver 219 modifies corridor widths or room dimensions, material estimation module 218 automatically recalculates material quantities for affected assemblies. This ensures that estimates remain synchronized with constraint-enforced object models without requiring manual recalculation.

In another embodiment, material estimation module 218 generates multi-material usage profiles for complex assemblies. A floor assembly may include structural framing, subflooring, insulation, and finish layers. The module decomposes the assembly into its constituent layers based on schema definitions, applies material mapping rules to each layer, and compiles the results into a structured bill-of-materials output. This machine-executed decomposition demonstrates a technical improvement over static rule-based estimation by enabling schema-driven multi-layer computation tied directly to parametric assemblies.

In accordance with various embodiments, material estimation module 218 coordinates with planning system 105 to embed computed quantities into technical project plans and with metadata propagator 213 to attach provenance tags that record source assemblies, applied rules, and calculation timestamps. These outputs may be stored in structured formats for integration with scheduling, procurement, or optimization routines.

Geometry-kernel adapter 223 is operable to translate schema-conformant object models into executable operations within geometric kernels. More specifically, geometry-kernel adapter 223 is operable to encode parametric assemblies, constraint instructions, and adjacency relationships into kernel-compatible commands that preserve topological integrity and dimensional consistency.

In certain embodiments, geometry-kernel adapter 223 receives object representations from parametric assembly generator 211, compiled instruction sequences from spatial instruction compiler 215, and constraint enforcement updates from constraint solver 219. The adapter transforms these inputs into kernel-specific primitives, such as boundary representations (B-reps), constructive solid geometry (CSG) trees, or mesh operators. A geometric kernel, as used herein, refers to a computational engine that performs Boolean operations, surface tessellation, and topological validation on geometric entities.

In an embodiment, geometry-kernel adapter 223 processes a room assembly defined by parametric width, length, and height attributes. The adapter generates kernel instructions to construct a boundary representation with topologically valid faces, enforces adjacency conditions by embedding shared edge definitions with connected assemblies, and executes a Boolean subtraction operation to carve circulation paths. If constraint solver 219 subsequently modifies the corridor width parameter, geometry-kernel adapter 223 regenerates kernel operations to maintain consistency without reconstructing the entire model.

In accordance with various embodiments, geometry-kernel adapter 223 includes error handling logic to detect and correct invalid kernel states. For example, if overlapping assemblies produce non-manifold geometry, the adapter resolves conflicts by recalculating intersections and reapplying Boolean operators in a deterministic sequence. This ensures that object models remain valid inputs for optimization engine 170 and planning system 105.

In another embodiment, geometry-kernel adapter 223 applies tessellation routines to generate mesh outputs suitable for visualization or simulation. The adapter translates parametric surface definitions into triangulated meshes, associates mesh identifiers with assembly metadata propagated by metadata propagator 213, and stores the results for rendering by 3D modeling tool 212. This technical process demonstrates a machine-executed transformation of high-level schema objects into executable kernel operations, improving the ability of computing systems to enforce spatial constraints algorithmically.

In accordance with various embodiments, geometry-kernel adapter 223 coordinates with topology & adjacency graph manager 221 to preserve relational links during kernel transformations and with generation orchestrator 225 to schedule kernel operations across assemblies. This ensures that spatial object models are processed consistently, validated structurally, and prepared for iterative optimization cycles.

Topology & adjacency graph manager 221 is operable to construct and maintain graph-based representations of relationships between parametric assemblies in schema-conformant object models. More specifically, topology & adjacency graph manager 221 is operable to encode assemblies as graph nodes, adjacency relationships as graph edges, and topological dependencies as rule-constrained paths that can be traversed and validated algorithmically.

In certain embodiments, topology & adjacency graph manager 221 generates adjacency graphs from spatial attributes mapped by schema mapper 210 and constraint objects derived by spatial constraint analyzer 206. Graph edges may encode dimensional tolerances, circulation requirements, or dependency conditions, and are updated dynamically as assemblies are modified by parametric assembly generator 211 or constraint solver 219. A topology graph, as used herein, refers to a machine-readable representation of assembly connectivity that supports traversal, path validation, and constraint propagation across multiple assemblies.

In an embodiment, topology & adjacency graph manager 221 receives a multi-unit housing model composed of room, corridor, and stair assemblies. The manager constructs a graph where room assemblies are nodes, corridor assemblies are edges, and stair assemblies are tagged as vertical connectors. Traversal algorithms are then applied to verify that each room is reachable through at least two independent circulation paths, producing validation outputs that can be consumed by design validation component 216.

In accordance with various embodiments, topology & adjacency graph manager 221 applies constraint-driven updates to adjacency graphs. For example, if constraint solver 219 enforces a circulation width increase, the manager automatically updates edge weights to reflect modified dimensional parameters and propagates these changes through connected nodes. This enables subsequent modules, such as metric & objective calculator 227, to evaluate updated circulation efficiency without recomputing the entire object model.

In another embodiment, topology & adjacency graph manager 221 resolves conflicts between overlapping assemblies by recalculating adjacency graphs with updated node and edge definitions. If two corridor assemblies are placed in overlapping positions, the manager identifies the redundancy, merges their graph edges, and updates adjacency constraints to preserve connectivity while eliminating invalid topological states. This process demonstrates a technical improvement by enabling machine-executed reconciliation of spatial relationships that would otherwise require manual redrawing.

In accordance with various embodiments, topology & adjacency graph manager 221 coordinates with geometry-kernel adapter 223 to maintain consistent topological links during geometric kernel transformations and with generation orchestrator 225 to ensure that adjacency updates are synchronized across iterative optimization cycles. By maintaining dynamic graph structures, topology & adjacency graph manager 221 enables automated evaluation and modification of spatial connectivity at a computational level not achievable with static manual methods.

Generation orchestrator 225 is operable to coordinate iterative modification cycles of schema-conformant object models under constraint conditions. More specifically, generation orchestrator 225 is operable to schedule execution of parametric updates, apply constraint resolution routines in ordered sequences, and generate candidate object models that reflect alternative spatial configurations.

In certain embodiments, generation orchestrator 225 manages iterative modification by reconfiguring adjacency graphs, adjusting dimensional parameters, or regenerating assemblies in accordance with rule sets produced by schema mapper 210 and constraint objects derived by spatial constraint analyzer 206. Iterative modification, as used herein, refers to a machine-executed process of systematically adjusting assembly parameters and relationships across successive model states until evaluation metrics indicate an optimized configuration.

In an embodiment, generation orchestrator 225 generates a series of candidate object models by iteratively adjusting corridor widths, repositioning circulation nodes, and reconfiguring adjacency relationships while applying constraint solver 219 to enforce zoning and circulation rules at each step. Each candidate model is recorded with performance values computed by metric & objective calculator 227, allowing optimization engine 170 to rank alternatives and select an optimized configuration.

In accordance with various embodiments, generation orchestrator 225 applies rule-driven scheduling to determine the order of modification steps. For example, dimension adjustments may be executed prior to adjacency reconfiguration to ensure that spatial limits are enforced before circulation paths are recalculated. The orchestrator may also implement rollback protocols, reverting to prior model states if constraint solver 219 detects irresolvable conflicts.

In another embodiment, generation orchestrator 225 applies constraint-driven branching, where a single object model is split into multiple candidate models by adjusting different assemblies independently. For instance, when optimizing a multi-unit dwelling, generation orchestrator 225 may create parallel models with varying stair configurations, enforce compliance checks on each, and forward valid alternatives to optimization engine 170 for ranking. This machine-executed branching process demonstrates a technical improvement by enabling the computer to generate multiple valid design paths algorithmically rather than relying on a manually selected design sequence.

In accordance with various embodiments, generation orchestrator 225 coordinates with topology & adjacency graph manager 221 to maintain consistent graph structures across iterations and with metadata propagator 213 to propagate lineage tags recording modification sequences. By executing structured cycles of iterative modification and candidate model generation, generation orchestrator 225 provides machine-level orchestration by iterative modification of schema-conformant object representations under structured rule sets.

Metric & objective calculator 227 is operable to compute quantitative performance values for candidate object models generated during iterative modification cycles. More specifically, metric & objective calculator 227 is operable to evaluate schema-conformant object models against dimensional efficiency measures, constraint compliance indicators, and resource allocation calculations, producing structured performance values that guide model optimization.

In certain embodiments, metric & objective calculator 227 retrieves candidate object models from generation orchestrator 225, accesses adjacency graphs maintained by topology & adjacency graph manager 221, and applies quantitative evaluation logic to assess circulation efficiency, material usage, and compliance consistency. A performance value, as used herein, refers to a structured numerical or categorical indicator that quantifies an assembly or model property for comparison across candidate configurations.

In an embodiment, metric & objective calculator 227 computes a circulation efficiency value by traversing adjacency graphs to calculate total travel distance between functional assemblies, compares the result to a target threshold encoded in the structured rule set, and records a performance value that reflects efficiency compliance. If circulation paths exceed allowable lengths, the module generates a low efficiency score, which is propagated to optimization engine 170 for consideration during model ranking.

In accordance with various embodiments, metric & objective calculator 227 also computes material usage values by integrating with material estimation module 218. For example, when evaluating two candidate models with identical footprints but differing corridor layouts, the module calculates drywall usage, flooring requirements, and structural framing quantities, then compares totals against material allocation objectives. This provides a machine-executed means of quantifying trade-offs that would otherwise require manual calculation.

In another embodiment, metric & objective calculator 227 applies rule-based validation metrics to quantify constraint compliance. The module evaluates whether candidate models satisfy setback, circulation, or floor-area ratio conditions, and encodes compliance levels as weighted performance values. These weighted scores allow optimization engine 170 to select a candidate model with the highest aggregate compliance and efficiency balance.

In accordance with various embodiments, metric & objective calculator 227 coordinates with metadata propagator 213 to log performance evaluation results with lineage identifiers, ensuring traceability of which model iterations produced specific scores. Metric & objective calculator 227 may further interface with optimization engine 170 to deliver structured performance values used for ranking candidate models and selecting an optimized configuration. By converting schema-conformant object models into quantifiable performance metrics, metric & objective calculator 227 provides a machine-implemented evaluation mechanism that supports automated optimization and distinguishes the system from manual design review methods.

Component library database 220 is operable to store and provide schema-conformant records of pre-engineered spatial assemblies for use in object model generation. More specifically, component library database 220 is operable to maintain structured definitions of parametric assemblies, associate them with dimensional attributes and material specifications, and make these records available to parametric assembly generator 211 during object model construction.

In certain embodiments, component library database 220 encodes assemblies as schema-conformant data objects that include adjustable parameters, adjacency rules, and material mappings. A schema-conformant assembly record, as used herein, refers to a structured entry in the database that defines a spatial component in terms of modifiable attributes rather than fixed geometry, enabling machine-executed generation and iterative modification.

In an embodiment, component library database 220 stores a wall assembly record that specifies dimensional parameters (height, length, thickness), adjacency constraints (must connect to floor and ceiling assemblies), and material mappings (concrete, drywall, insulation layers). When parametric assembly generator 211 instantiates a wall object, it retrieves this record, applies constraint objects parsed by spatial constraint analyzer 206, and adjusts the wall parameters accordingly. The database record ensures that even after modification, the wall remains schema-conformant and compatible with other assemblies in the model.

In accordance with various embodiments, component library database 220 supports indexing and retrieval logic that allows assemblies to be queried by type, material specification, or constraint compatibility. For example, when optimization engine 170 requires candidate assemblies that satisfy fire-safety adjacency rules, component library database 220 returns only those assembly records with compliant attributes. This enables machine-executed selection of assemblies during iterative modification cycles, improving the ability of the computing system to generate optimized models.

In another embodiment, component library database 220 coordinates with metadata propagator 213 to attach lineage information, including source identifiers, revision history, and update timestamps, to each assembly record. This ensures that instantiated assemblies can be traced back to their originating definitions for audit or validation. Component library database 220 may also coordinate with planning system 105 to embed assembly attributes into project plans, enabling consistent material estimation and scheduling outputs.

Regulatory database 222 is operable to store structured representations of constraint rules derived from zoning codes, building regulations, and safety standards. More specifically, regulatory database 222 is operable to maintain constraint objects in schema-conformant form, enabling machine-executed retrieval and application of rule sets during object model generation and validation.

In certain embodiments, regulatory database 222 encodes constraint rules as structured records comprising parameter definitions, threshold values, and relational conditions. A constraint object, as used herein, refers to a machine-readable data structure that defines allowable ranges, adjacency dependencies, or exclusionary conditions applicable to one or more parametric assemblies. These constraint objects provide the basis for spatial constraint analyzer 206 to derive structured rule sets, and for regulatory compliance analyzer 214 to validate assemblies against applicable conditions.

In an embodiment, regulatory database 222 stores a setback requirement specifying that wall assemblies must be located a minimum distance from property boundaries. The requirement is encoded as a constraint object with parameters for minimum distance, applicable assembly types, and exception conditions. When schema mapper 210 aligns survey data with schema attributes, the setback constraint is retrieved from regulatory database 222, applied to relevant assemblies by constraint solver 219, and validated by design validation component 216.

In accordance with various embodiments, regulatory database 222 supports multi-jurisdictional rule storage by associating constraint objects with metadata tags indicating region, authority, and effective date. This enables parametric design engine 103 to retrieve and apply rule sets specific to a project location, ensuring that object models remain compliant across varying regulatory contexts.

In another embodiment, regulatory database 222 coordinates with metadata propagator 213 to preserve lineage data for each constraint object, including the source text of the regulation, parsing timestamp, and versioning identifiers. This allows validation outcomes generated by regulatory compliance analyzer 214 to be traced directly to the originating regulatory provision. In accordance with various embodiments, regulatory database 222 provides technical support for processing heterogeneous input data, deriving structured rule sets, and applying constraint conditions to schema-conformant object models. By storing and indexing constraints as structured objects rather than unstructured legal text, regulatory database 222 enables the computing system to enforce compliance algorithmically, distinguishing the disclosed system from manual regulatory review methods.

Material cost database 224 is operable to store structured cost data associated with materials referenced in schema-conformant object models. More specifically, material cost database 224 is operable to maintain indexed records of material attributes, unit pricing, and cost adjustment factors, enabling machine-executed cost estimation during model generation and evaluation.

In certain embodiments, material cost database 224 encodes material records with fields for standardized identifiers, dimensional units, base cost per unit, and applicable modifiers such as regional multipliers or supply chain adjustments. A material record, as used herein, refers to a structured schema entry that links assembly attributes to quantifiable cost data. These records provide the basis for material estimation module 218 to compute usage costs and for metric & objective calculator 227 to evaluate cost-related performance values.

In an embodiment, material cost database 224 stores pricing records for concrete in both cubic meters and cubic yards. When parametric assembly generator 211 instantiates a foundation assembly, material estimation module 218 queries material cost database 224, retrieves the relevant cost record, and applies a conversion factor standardized by coordinate & unit normalizer 205. The resulting cost calculation is then incorporated into the performance values computed by metric & objective calculator 227.

In accordance with various embodiments, material cost database 224 supports versioning and temporal indexing to reflect market fluctuations. For example, when supply costs change, updated pricing records are stored alongside historical records with effective date metadata. This enables material estimation module 218 to generate cost outputs aligned with project-specific timelines, ensuring consistent and auditable evaluations.

In another embodiment, material cost database 224 associates material records with constraint objects retrieved from regulatory database 222. For instance, if a fire-rated wall assembly requires specialized gypsum board, material cost database 224 provides the appropriate cost record when the regulatory compliance analyzer 214 applies the constraint. This ensures that regulatory compliance adjustments are reflected in material cost calculations automatically.

Material cost database 224 coordinates with metadata propagator 213 to preserve lineage identifiers for each pricing record, including source provider, update timestamp, and currency normalization details. These lineage attributes enable auditability of cost values embedded in project plans generated by planning system 105.

Site context database 226 is operable to store structured spatial datasets describing environmental and land-plot conditions relevant to schema-conformant object models. More specifically, site context database 226 is operable to maintain records of topographical geometry, boundary definitions, environmental constraints, and contextual attributes that influence object model generation, constraint enforcement, and optimization.

In certain embodiments, site context database 226 encodes site-related information as schema-conformant entries, including boundary coordinates, elevation profiles, hydrological data, and environmental impact attributes. A site context record, as used herein, refers to a structured data object that represents geospatial and environmental properties in a format that can be directly applied to constraint objects, adjacency graphs, or parametric assemblies. These records are retrieved by spatial constraint analyzer 206 to derive constraint conditions and by schema mapper 210 to align site attributes with assembly parameters.

In an embodiment, site context database 226 stores a boundary record describing a parcel's coordinates, an elevation map of the terrain, and a floodplain classification. When parametric assembly generator 211 instantiates foundation assemblies, constraint solver 219 retrieves elevation data from the site context database 226, enforces slope-related tolerances, and adjusts placement of assemblies to avoid the floodplain. This machine-executed enforcement ensures that generated models reflect environmental conditions encoded as structured constraint objects rather than relying on manual site review.

In accordance with various embodiments, site context database 226 supports multi-layer geospatial indexing to manage relationships between site attributes. For example, adjacency graphs generated by topology & adjacency graph manager 221 may integrate both property boundary data and environmental setback conditions, allowing optimization engine 170 to generate candidate object models that account for terrain slopes, protected areas, and circulation efficiency simultaneously.

In another embodiment, site context database 226 provides environmental performance attributes for evaluation by metric & objective calculator 227. For instance, when candidate models include different roof orientations, the calculator may retrieve solar exposure data from site context database 226 and compute a performance value reflecting energy efficiency potential. This demonstrates a technical improvement by encoding environmental awareness into computable metrics that are evaluated by machine logic rather than subjective human assessment. In accordance with various embodiments, site context database 226 coordinates with metadata propagator 213 to preserve provenance of site attributes, including survey source, measurement methods, and update timestamps. These lineage records ensure that constraint conditions and performance values derived from site data can be traced back to authoritative geospatial sources.

Spatial grammar & IR schema repository 229 is operable to store machine-readable definitions of spatial grammars and intermediate representation (IR) schemas used to encode object models. More specifically, spatial grammar & IR schema repository 229 is operable to define syntax and rule structures for expressing architectural, geometric, and physical constraints as computable tokens, and to provide schema templates that standardize the transformation of heterogeneous spatial inputs into schema-conformant object representations.

In certain embodiments, spatial grammar & IR schema repository 229 encodes grammars as production rules that map spatial concepts into symbolic operators. A spatial grammar, as used herein, refers to a formal language where terminals represent parametric components (e.g., walls, corridors, stair cores) and non-terminals define composite assemblies or adjacency relationships. An intermediate representation schema, as used herein, refers to a structured template for encoding constraint objects, assembly attributes, and adjacency links in a format that can be processed by spatial instruction compiler 215 and constraint solver 219.

In an embodiment, spatial grammar & IR schema repository 229 defines a grammar rule expressing that a circulation assembly must terminate in an egress assembly. The grammar is compiled into an IR schema where "corridor" nodes must connect to "exit" nodes, encoded as adjacency constraints. When schema mapper 210 processes zoning data, it references this repository to generate schema-conformant constraint objects that can be validated by design validation component 216.

In accordance with various embodiments, spatial grammar & IR schema repository 229 also provides transformation templates for normalizing unstructured survey inputs into IR encodings. For example, an unstructured description such as "minimum hallway width of 42 inches" is parsed into tokens, matched to the grammar rule for circulation width, and transformed into a schema object with a normalized dimensional attribute.

In another embodiment, spatial grammar & IR schema repository 229 supports iterative model refinement by supplying rule expansion operators to generation orchestrator 225. When generating candidate object models, the orchestrator may apply expansion rules that produce alternative configurations, such as varying room adjacency layouts, while preserving compliance with grammar-defined constraints.

Spatial grammar & IR schema repository 229 coordinates with metadata propagator 213 to preserve provenance of grammar definitions, including versioning, authoring source, and applied context. This allows validation outcomes and optimization cycles to be directly traced to the grammar and schema rules that governed model generation.

Accordingly, in accordance with various embodiments, the architecture of parametric design engine 103 provides a technical solution to the problem of enabling computing systems to generate schema-conformant object models from heterogeneous spatial inputs. The coordinated operation of components transform unstructured and inconsistent datasets into structured rule sets, instantiates parametric assemblies that encode spatial relationships, compiles machine-executable instructions for constraint enforcement, and applies iterative modification cycles under rule-based orchestration. This process results in candidate object models that are quantitatively evaluated using computed performance values, including circulation efficiency and material usage, which cannot be assessed by static templates or manual drafting alone. By converting heterogeneous inputs into executable computational objects and applying constraint resolution logic to generate optimized object models, the disclosed system improves the technical field of computer-implemented spatial modeling and constraint-based design, rather than merely automating manual design practices.

Optimization Engine

Figure 3:
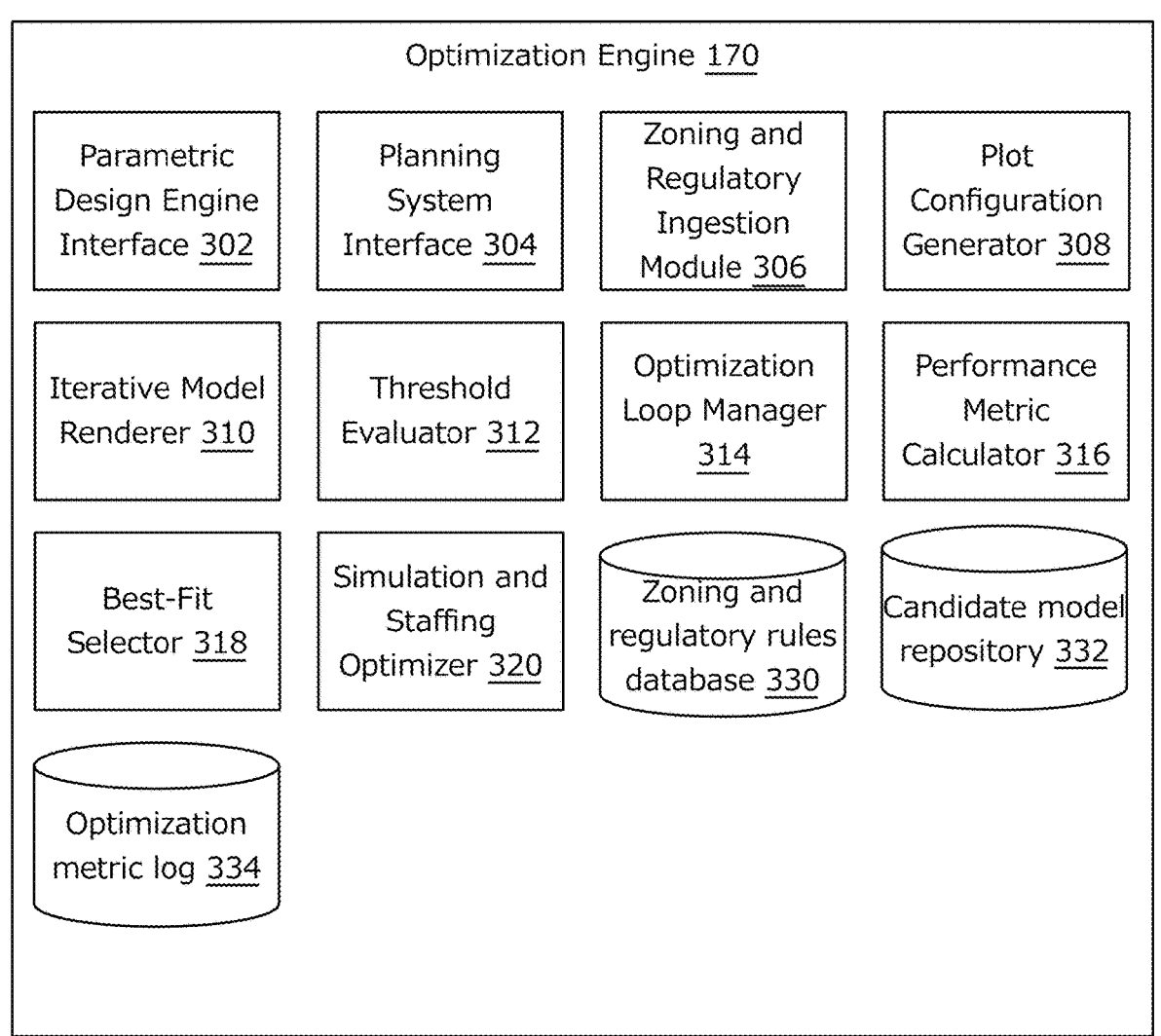
FIG. 3 illustrates an example configuration of an optimization engine, in accordance with various embodiments.

FIG. 3 illustrates an example architecture of the optimization engine 170 in accordance with various embodiments. The various components described herein are exemplary and for illustration purposes only. As shown, optimization engine 170 comprises parametric design engine interface 302, planning system interface 304, zoning and regulatory ingestion module 306, plot configuration generator 308, iterative model renderer 310, threshold evaluator 312, optimization loop manager 314, performance metric calculator 316, best-fit selector 318, and simulation and staffing optimizer 320. Optimization engine 170 may also include or be in communication with one or more data repositories, including zoning and regulatory rules database 330, candidate model repository 332, and optimization metric log 334. Other system configurations may be used, as would be understood by a person of ordinary skill in the art, without departing from the scope of the invention.

Parametric design engine interface 302 is operable to exchange structured object representations and constraint conditions between parametric design engine 103 and optimization engine 170. More specifically, parametric design engine interface 302 is operable to receive schema-conformant object models generated by parametric assembly generator 211, transmit these models into the optimization pipeline, and return updated configurations following optimization cycles.

In certain embodiments, parametric design engine interface 302 registers input object models by assigning identifiers, validating schema compliance, and converting assemblies into a format compatible with optimization engine 170. Object models, as used herein, refer to schema-conformant data structures comprising parametric assemblies, adjacency relationships, and constraint conditions that define spatial configurations. Parametric design engine interface 302 may also normalize metadata tags propagated by metadata propagator 213, ensuring lineage attributes remain accessible during optimization.

In an embodiment, parametric design engine interface 302 receives an object model of a residential floor plan composed of corridor, room, and stair assemblies. The interface validates adjacency graphs, encodes constraint conditions into kernel-compatible structures, and transmits the model to iterative model renderer 310 for candidate generation. After optimization loop manager 314 completes an iteration, parametric design engine interface 302 re-integrates the updated object model into parametric design engine 103 for visualization through 3D modeling tool 212 or validation through design validation component 216.

In accordance with various embodiments, parametric design engine interface 302 coordinates with planning system interface 304 to ensure that optimized models are compatible with technical plan generation. For example, when candidate models are ranked by best-fit selector 318, parametric design engine interface 302 prepares the optimized model with schema alignment and metadata so that planning system 105 can directly generate construction instructions, material requirements, and scheduling data. This coordination ensures that candidate models produced during optimization retain structural and constraint integrity within the broader system architecture.

Planning system interface 304 is operable to exchange optimized object models and associated performance data between optimization engine 170 and planning system 105. More specifically, planning system interface 304 is operable to transmit schema-conformant object models selected by best-fit selector 318 into the planning workflow, encode optimization metadata into technical plan inputs, and receive confirmations or feedback generated during plan compilation.

In certain embodiments, planning system interface 304 validates the structural completeness of optimized models before transfer, ensures constraint objects are preserved in schema-conformant form, and attaches optimization metrics recorded by performance metric calculator 316. A technical plan input, as used herein, refers to a structured dataset that includes spatial assemblies, constraint satisfaction states, and performance values, formatted for conversion into technical construction plans.

In an embodiment, planning system interface 304 transmits an optimized multi-unit layout generated by iterative model renderer 310 to planning system 105. The interface encodes assembly identifiers, adjacency graphs, and material quantities calculated by material estimation module 218, along with performance values such as circulation efficiency or floor-area ratio compliance. Planning system 105 then compiles these inputs into technical drawings and construction schedules while retaining the optimization lineage.

In accordance with various embodiments, planning system interface 304 also supports bidirectional exchange of constraint feedback. For example, when planning system 105 determines that a material substitution is required due to local availability, the interface records the substitution as a constraint update and transmits it back to optimization engine 170. Optimization loop manager 314 may then re-execute candidate generation with the updated constraint encoded in the rule set.

Planning system interface 304 coordinates with parametric design engine interface 302 to ensure schema alignment across components, and with optimization metric log 334 to append lineage tags that record which optimization cycles produced the transferred model. By structuring exchanges as machine-readable schema objects with constraint metadata, planning system interface 304 enables generating schema-conformant object models, computing performance values, and producing validated outputs suitable for technical plan generation.

Zoning and regulatory ingestion module 306 is operable to obtain heterogeneous rule inputs from zoning datasets, building codes, and safety standards, and transform those inputs into structured constraint objects compatible with optimization engine 170. More specifically, zoning and regulatory ingestion module 306 is operable to ingest unstructured or semi-structured regulatory data, apply parsing and normalization logic, and compile machine-readable rule sets that govern allowable object model configurations.

In certain embodiments, zoning and regulatory ingestion module 306 performs tokenization of raw text, applies grammar-based parsing rules, and maps extracted provisions into schema attributes defined in spatial grammar & IR schema repository 229. A constraint object, as used herein, refers to a structured record comprising rule identifiers, dimensional thresholds, adjacency dependencies, or exclusionary conditions, which can be applied directly to parametric assemblies generated by parametric design engine 103.

In an embodiment, zoning and regulatory ingestion module 306 processes a municipal zoning ordinance that specifies a maximum floor-area ratio and minimum setbacks. The module parses the ordinance text, normalizes measurement units into a consistent schema, and encodes the requirements into constraint objects with attributes for maximum area-per-parcel and minimum offset distances. These constraint objects can be stored in zoning and regulatory rules database 330, linked with metadata identifying jurisdiction and effective date, and retrieved during optimization cycles for enforcement by constraint solver 219.

In accordance with various embodiments, zoning and regulatory ingestion module 306 supports multi-source integration by combining inputs from text repositories, GIS datasets, and structured rule feeds. For example, the module may retrieve geospatial boundary conditions from a planning authority's GIS service and cross-reference them with building height restrictions specified in text ordinances. The combined results are compiled into a unified structured rule set that can be applied to candidate models during iterative rendering by iterative model renderer 310.

Zoning and regulatory ingestion module 306 coordinates with plot configuration generator 308 to supply constraint objects governing allowable plot configurations, and with performance metric calculator 316 to ensure evaluation scores incorporate regulatory compliance metrics. The module may also propagate metadata through metadata propagator 213, ensuring lineage of rule ingestion, parsing, and normalization is preserved for audit and validation purposes. Accordingly, by converting heterogeneous regulatory inputs into structured schema-conformant rule sets, zoning and regulatory ingestion module enables obtaining input data, processing the data using parsing logic to derive structured rule sets, and applying constraint conditions to schema-conformant object models.

Plot configuration generator 308 is operable to generate schema-conformant object representations of buildable plots based on ingested site attributes and regulatory constraint objects. More specifically, plot configuration generator 308 is operable to apply dimensional boundaries, zoning conditions, and environmental data to construct parametric plot layouts that serve as the foundation for candidate model generation within optimization engine 170.

In certain embodiments, plot configuration generator 308 retrieves parcel boundaries and elevation profiles from site context database 226, accesses zoning constraint objects from zoning and regulatory rules database 330, and synthesizes these inputs into schema-conformant plot objects. A plot object, as used herein, refers to a structured representation of a buildable parcel encoded with dimensional limits, setback zones, and allowable usage areas. These plot objects are passed to iterative model renderer 310 as the initial search space for candidate model generation.

In an embodiment, plot configuration generator 308 processes a parcel dataset describing a rectangular lot adjacent to a protected wetland. The generator encodes the property boundary into a spatial object, applies setback constraints retrieved from zoning and regulatory ingestion module 306, and adjusts the buildable footprint by excluding the buffer zone surrounding the wetland. The resulting plot object is schema-conformant, tagged with constraint metadata, and used as the geometric baseline for candidate model iteration.

In accordance with various embodiments, plot configuration generator 308 applies spatial partitioning logic to subdivide parcels into multiple buildable zones. For example, when a multi-unit dwelling is permitted, the generator may partition the lot into repeating modules while preserving minimum circulation space as defined in the constraint objects. These partitions are recorded as parametric assemblies, enabling iterative adjustment by optimization loop manager 314.

Plot configuration generator 308 coordinates with threshold evaluator 312 to confirm that generated plots fall within allowable dimensional ranges and with topology & adjacency graph manager 221 (via parametric design engine interface 302) to encode adjacency constraints between parcels, access paths, or service corridors. By generating structured plot objects under enforceable rule sets, plot configuration generator 308 enables processing input data, deriving structured rule sets, and generating schema-conformant object representations suitable for automated optimization.

Iterative model renderer 310 is operable to generate candidate object models by applying iterative modifications to schema-conformant object representations under structured rule sets. More specifically, iterative model renderer 310 is operable to reposition spatial components, adjust dimensional parameters, and reconfigure adjacency relationships across multiple cycles, producing alternative candidate models for evaluation within optimization engine 170.

In certain embodiments, iterative model renderer 310 retrieves initial plot objects from plot configuration generator 308, applies constraint objects stored in zoning and regulatory rules database 330, and executes modification routines directed by optimization loop manager 314. A candidate object model, as used herein, refers to a machine-generated spatial configuration that conforms to schema definitions but differs in assembly arrangement, adjacency structure, or dimensional allocation.

In an embodiment, iterative model renderer 310 receives a plot object permitting three residential units. The module generates candidate models by incrementally adjusting corridor widths, rotating unit orientations, and modifying adjacency graphs to test multiple circulation patterns. Each iteration enforces compliance with setback and egress constraints retrieved by zoning and regulatory ingestion module 306. The results are stored in candidate model repository 332 with lineage identifiers for later ranking by best-fit selector 318.

In accordance with various embodiments, iterative model renderer 310 applies constraint-propagation logic to ensure consistency across iterations. For example, when dimensional adjustments to a corridor assembly reduce circulation space below a threshold, the renderer automatically modifies adjacent room assemblies to restore compliance. This machine-executed propagation distinguishes the system from static design templates by embedding enforceable constraint logic into each generated candidate.

Iterative model renderer 310 coordinates with performance metric calculator 316 to attach preliminary evaluation scores to each generated candidate and with topology & adjacency graph manager 221 (via parametric design engine interface 302) to maintain graph consistency across iterations. By generating multiple candidate models through structured, rule-driven modification cycles, iterative model renderer 310 enables generating candidate object models by iterative modification of schema-conformant object representations under constraint conditions.

Threshold evaluator 312 is operable to compare computed attributes of candidate object models against predefined constraint thresholds. More specifically, threshold evaluator 312 is operable to receive dimensional, relational, or regulatory parameters associated with a candidate model, compare these parameters to threshold values encoded in constraint objects, and generate compliance indicators for use by optimization engine 170.

In certain embodiments, threshold evaluator 312 applies rule-based evaluation logic that includes numerical comparison, adjacency validation, and ratio assessment. A threshold value, as used herein, refers to a structured condition such as a minimum or maximum dimensional limit, a proportional requirement, or a circulation ratio derived from zoning and regulatory ingestion module 306. Candidate object models that satisfy all applicable thresholds are marked as valid for further evaluation, while models exceeding thresholds are flagged for revision or elimination.

In an embodiment, threshold evaluator 312 processes a candidate model for a hotel structure. The evaluator compares calculated floor-area ratio values against maximum ratios stored in zoning and regulatory rules database 330, verifies that corridor widths exceed minimum egress dimensions, and ensures that stair adjacency satisfies dual-access requirements. Models that meet these thresholds are retained in candidate model repository 332, while models failing threshold checks are marked with violation metadata for traceability.

In accordance with various embodiments, threshold evaluator 312 integrates with performance metric calculator 316 to embed compliance scores into performance value calculations. For example, when circulation efficiency is measured, the evaluator confirms that calculated values remain within allowable ranges before passing them to optimization loop manager 314. This integration ensures that threshold satisfaction is directly reflected in the model's overall performance evaluation.

Threshold evaluator 312 coordinates with optimization loop manager 314 to enforce early pruning of candidate models. By discarding or flagging models that violate key thresholds before full optimization cycles, threshold evaluator 312 reduces redundant iterations while preserving compliance metadata. These results are logged into optimization metric log 334 for later audit and analysis. Accordingly, by implementing threshold-based evaluation as a machine-executed comparison process, threshold evaluator 312 enables computing performance values and enforcing constraint conditions during generation of schema-conformant object models.

Optimization loop manager 314 is operable to coordinate iterative modification cycles applied to schema-conformant object models. More specifically, optimization loop manager 314 is operable to schedule modification routines executed by iterative model renderer 310, enforce evaluation steps by threshold evaluator 312, and direct selection processes that refine candidate models over successive optimization cycles.

In certain embodiments, optimization loop manager 314 orchestrates an optimization loop that includes the following phases: (1) generate candidate models by iterative modification of a base object representation, (2) evaluate compliance of each candidate model against threshold conditions, (3) compute performance values through performance metric calculator 316, and (4) record results for ranking and potential re-iteration. In an embodiment, this loop continues until termination criteria, such as performance convergence or maximum iteration counts, are satisfied.

In an embodiment, optimization loop manager 314 receives a base residential layout object from parametric design engine interface 302. The module directs iterative model renderer 310 to produce multiple variants with adjusted adjacency graphs and circulation widths, instructs threshold evaluator 312 to enforce minimum egress requirements, and invokes performance metric calculator 316 to assign performance values to each candidate. The loop manager then directs best-fit selector 318 to retain the top candidates and initiates another iteration with refined parameter ranges.

In accordance with various embodiments, optimization loop manager 314 applies branching logic to explore multiple design paths simultaneously. For example, when optimizing a mixed-use parcel, the module may generate parallel candidate sets with differing adjacency strategies—such as ground-floor retail versus residential-only—and run evaluation loops for each path. Candidate models that fail threshold evaluation are automatically pruned, while high-performing candidates are refined in subsequent iterations.

Optimization loop manager 314 coordinates with candidate model repository 332 to persist intermediate models generated during optimization and with optimization metric log 334 to maintain lineage records of iteration outcomes, including performance values, constraint violations, and convergence status. This ensures that optimization results remain auditable and traceable across iterations. Accordingly, by structuring optimization as a machine-executed loop with defined modification, evaluation, and selection phases, optimization loop manager 314 enables generating candidate object models by iterative modification, computing performance values, and generating optimized object models under constraint conditions.

Performance metric calculator 316 is operable to compute quantitative performance values for candidate object models generated during iterative optimization. More specifically, performance metric calculator 316 applies machine-executed evaluation logic that measures spatial efficiency, constraint compliance, material utilization, and other quantifiable characteristics of a candidate model in accordance with the structured rule set.

In certain embodiments, performance metric calculator 316 derives spatial efficiency values by evaluating adjacency graphs, circulation paths, and dimensional allocations within the object model. For example, the module may calculate a ratio of usable floor area to total plot coverage or determine travel distances between functional spaces, assigning higher efficiency scores to layouts with minimized circulation waste. Constraint compliance may be quantified by applying rule-based validation logic that checks fire egress distances, zoning setbacks, or maximum occupancy thresholds encoded in the structured rule set.

In an embodiment, performance metric calculator 316 computes material usage values by referencing parametric attributes embedded in assemblies and correlating them with entries in material cost database 224. For instance, wall assemblies defined by parametric design engine 103 may specify lengths, heights, and material layers, which the module aggregates into volumetric material quantities. These quantities are compared against expected tolerances to assess efficiency and cost predictability.

In accordance with various embodiments, performance metric calculator 316 integrates results across multiple categories into weighted objective scores. Weighting factors may be dynamically adjusted based on user-specified optimization targets, such as prioritizing maximum occupancy capacity for hotel zoning configurations or minimizing structural spans for high-density residential parcels. The calculator may employ linear aggregation, constraint satisfaction scoring, or Pareto-front analysis to balance competing objectives.

For example, when applied to a candidate design for a multi-unit dwelling, performance metric calculator 316 may compute: (1) a spatial efficiency score by measuring unit compactness and corridor-to-room ratios; (2) a compliance score by validating required stairwell spacing under fire regulations; and (3) a material usage score by aggregating concrete volume and rebar length across assemblies. The calculator then integrates these scores into a composite performance value that is logged for later use by best-fit selector 318.

Performance metric calculator 316 coordinates with optimization metric log 334 to record all computed performance values with metadata such as iteration count, candidate identifier, and constraint evaluation results. These records establish traceability for audit and verification of optimization outcomes. Accordingly, in accordance with various embodiments, performance metric calculator 316 enables computing performance values for candidate object models using machine-executed evaluation logic that applies quantitative analysis of spatial efficiency and constraint compliance.

Best-fit selector 318 is operable to generate an optimized object model from the plurality of candidate object models by ranking and selecting based on computed performance values. More specifically, best-fit selector 318 applies machine-executed selection logic that evaluates quantitative scores received from performance metric calculator 316 and identifies a candidate object model with the highest composite performance ranking under the structured rule set.

In certain embodiments, best-fit selector 318 normalizes heterogeneous performance values—such as spatial efficiency ratios, compliance validation results, and material usage quantities—into a common scoring framework. Normalization may involve scaling values to unit intervals, applying logarithmic adjustments, or assigning weighted priorities based on optimization targets specified through planning system interface 304. For example, when user preferences emphasize material cost minimization over circulation efficiency, best-fit selector 318 applies a higher weight to material utilization scores before generating the composite ranking.

In an embodiment, best-fit selector 318 executes ranking logic using statistical methods, constraint satisfaction algorithms, or linear programming solvers. For instance, a Pareto-optimal front may be computed to identify non-dominated candidate object models, after which the selector chooses the candidate model with the highest weighted aggregate score. Alternatively, best-fit selector 318 may employ deterministic tie-breaking rules, such as selecting the model with the lowest material variance when multiple candidates exhibit equivalent compliance and efficiency scores.

In accordance with various embodiments, best-fit selector 318 incorporates threshold evaluator 312 outputs to ensure that only models meeting mandatory constraint thresholds are eligible for ranking. This prevents infeasible configurations—such as layouts exceeding zoning setbacks or circulation requirements—from being considered in the optimization process.

For example, in a scenario where iterative model renderer 310 has produced ten candidate object models for a multi-unit residential plot, performance metric calculator 316 may compute efficiency, compliance, and material scores for each candidate. Best-fit selector 318 receives these values, applies user-defined weights emphasizing compliance over cost, ranks the candidates, and generates the optimized object model by selecting the configuration with the highest weighted compliance-adjusted score.

Best-fit selector 318 is operable to register the selected optimized object model into candidate model repository 332 and update optimization metric log 334 with ranking outcomes, selection criteria, and metadata necessary for verification or audit purposes. Accordingly, in accordance with various embodiments, best-fit selector 318 enables generating an optimized object model based on computed performance values by applying structured ranking, threshold filtering, and weighted evaluation logic.

Simulation and staffing optimizer 320 is operable to extend optimization of object models by applying machine-executed simulation routines and workforce allocation logic. More specifically, simulation and staffing optimizer 320 models execution scenarios derived from the optimized object model and computes projected resource allocations, schedule impacts, and labor requirements to ensure that generated plans are both structurally compliant and operationally feasible.

In certain embodiments, simulation and staffing optimizer 320 performs time-based simulations of staged construction activities using discrete-event simulation or rule-based scheduling engines. For example, tasks encoded in spatial instruction compiler 215 outputs may be modeled as sequential or parallel events, with dependencies enforced by constraint solver 219 outputs. Execution times for each task may be retrieved from optimization metric log 334 or material cost database 224 and dynamically adjusted based on resource availability.

In an embodiment, simulation and staffing optimizer 320 applies machine-executed workforce optimization algorithms to determine staffing allocation across construction tasks. Workforce optimization may include (1) constraint-based assignment of trade-specific crews to tasks; (2) linear programming to minimize idle time or over-allocation; and (3) heuristics for balancing workload distribution across shifts. For example, if an object model requires simultaneous installation of electrical conduits and HVAC ducts, the optimizer allocates crews based on available labor skill tags and ensures compliance with adjacency constraints managed by topology and adjacency graph manager 221.

In accordance with various embodiments, simulation and staffing optimizer 320 computes performance values associated with staffing plans, including labor-hour efficiency, overlap minimization, and compliance with safety requirements encoded in zoning and regulatory rules database 330. These values are then integrated with the performance metric calculator 316 outputs to refine optimization outcomes.

For example, after best-fit selector 318 generates an optimized object model for a mid-rise multi-unit dwelling, simulation and staffing optimizer 320 may simulate the construction sequence over a 12-month horizon. During the simulation, the system determines that electrical installation is delayed due to material delivery constraints. The optimizer reallocates idle staffing resources from framing crews to accelerate preparatory work, thereby reducing total projected delay in the simulated schedule.

Simulation and staffing optimizer 320 is operable to store simulation outcomes, workforce allocation plans, and performance metrics in candidate model repository 332 and optimization metric log 334. These records support traceability, validation, and iterative refinement of both spatial and operational optimization processes. Accordingly, in accordance with various embodiments, simulation and staffing optimizer 320 can help ensure that generation of optimized object models is not limited to spatial or material constraints, but extends to technical feasibility under simulated resource and scheduling conditions, enabling computing performance values and generating optimized object models that account for constraint compliance and operational execution.

Zoning and regulatory rules database 330 is operable to store and provide structured representations of constraint rules derived from heterogeneous regulatory sources. More specifically, zoning and regulatory rules database 330 maintains schema-conformant constraint objects that define dimensional limits, occupancy restrictions, use classifications, fire codes, and other rule sets applicable to generated object models.

In certain embodiments, zoning and regulatory rules database 330 ingests heterogeneous inputs including zoning ordinances, municipal building codes, environmental regulations, and fire safety provisions. These inputs may originate as structured, semi-structured, or unstructured formats such as XML datasets, scanned ordinance PDFs, or text scraped from government websites. Zoning and regulatory ingestion module 306 applies machine-executed parsing logic to tokenize the text, apply grammar-based analysis, and map extracted constraints into schema-conformant objects stored in database 330.

In an embodiment, database 330 organizes constraint objects using a rule indexing schema that links each rule to spatial features, dimensional parameters, or adjacency relationships defined within object models. For example, a zoning rule requiring a minimum setback of 10 feet from property boundaries may be stored as a constraint object linked to the corresponding boundary nodes managed by topology and adjacency graph manager 221.

In accordance with various embodiments, zoning and regulatory rules database 330 supports query and retrieval operations by other components including constraint solver 219, threshold evaluator 312, and optimization loop manager 314. These components access stored rule objects to evaluate whether candidate object models remain schema-conformant under applicable constraints.

For example, when iterative model renderer 310 generates alternative configurations of a multi-unit dwelling, threshold evaluator 312 queries database 330 for applicable occupancy rules. Database 330 returns structured constraint objects specifying maximum unit density and egress width requirements. These objects are then applied to eliminate non-compliant candidates during the optimization cycle.

Zoning and regulatory rules database 330 is operable to log provenance metadata for each stored constraint object, including jurisdiction, effective date, and source reference. This ensures traceability and supports updates when new regulations are introduced. In some embodiments, the database maintains historical versions of constraints, enabling simulation and staffing optimizer 320 to model compliance scenarios under prior or alternative regulatory frameworks.

In accordance with various embodiments, zoning and regulatory rules database 330 enables processing heterogeneous input data into structured rule sets and applying those constraints to enforce compliance during generation of schema-conformant object models.

Candidate model repository 332 is operable to persist and manage multiple schema-conformant object models generated by iterative model renderer 310 under structured rule sets. More specifically, candidate model repository 332 stores parametric assemblies, adjacency graphs, and associated constraint compliance states, enabling evaluation and optimization of alternative spatial configurations.

In certain embodiments, candidate model repository 332 organizes object models as discrete records indexed by identifiers, version metadata, and rule compliance status. Each record may include the object model's parametric attributes, assembly structure, adjacency relationships, and material annotations derived from component library database 220. The repository maintains both compliant and non-compliant variants, allowing optimization loop manager 314 and threshold evaluator 312 to compare structural modifications across iterations.

In an embodiment, candidate model repository 332 stores intermediate object models produced by iterative model renderer 310. For example, when spatial components are repositioned to test alternate adjacency relationships, or when dimensional parameters are adjusted to satisfy setback constraints, repository 332 logs each candidate model with corresponding transformation metadata. This metadata enables optimization engine 170 to track how constraint enforcement or performance-driven modifications affect model evolution.

In accordance with various embodiments, candidate model repository 332 supports query operations by performance metric calculator 316 and best-fit selector 318. Performance metric calculator 316 retrieves stored object models to compute quantitative values for spatial efficiency, material utilization, or circulation pathing. Best-fit selector 318 queries the repository for candidate models ranked by performance metrics and retrieves the highest-ranked model for use by planning system interface 304.

Candidate model repository 332 may also maintain dependency links between object models and the rule sets used for their generation. For example, a candidate apartment tower configuration may be tagged to the zoning rule set requiring minimum egress width. If the zoning and regulatory rules database 330 is updated with new egress requirements, candidate model repository 332 can flag dependent object models as out-of-date and queue them for regeneration.

In certain embodiments, candidate model repository 332 logs provenance and simulation metadata. This includes timestamps, applied optimization parameters, constraint satisfaction results, and evaluation outcomes. Such metadata supports reproducibility of optimization workflows and provides auditability for confirming that generated object models were produced using valid constraint rules and objective functions.

In accordance with various embodiments, candidate model repository 332 provides machine-readable storage and retrieval of schema-conformant object models enabling generating candidate models, computing performance values, and selecting optimized results under constraint conditions.

Optimization metric log 334 is operable to record, persist, and retrieve quantitative evaluation data generated by performance metric calculator 316 during the assessment of candidate object models. More specifically, optimization metric log 334 provides structured storage of computed performance values, constraint compliance outcomes, and optimization parameters, ensuring that iterative refinements applied by optimization loop manager 314 can be auditable and reproducible.

In certain embodiments, optimization metric log 334 captures multiple classes of performance values, including dimensional efficiency, adjacency consistency, circulation pathing, and material usage. Each entry is indexed against a corresponding candidate object model identifier from candidate model repository 332, enabling direct association between stored models and their evaluation metrics. For example, if performance metric calculator 316 computes a circulation efficiency score of 0.82 for a specific parametric assembly configuration, optimization metric log 334 records the score along with the applied constraint set and iteration identifier.

In an embodiment, optimization metric log 334 records both raw values and normalized scores. Raw values may include absolute measurements such as square footage utilization or material volume, while normalized scores provide weighted or scaled indices that facilitate comparative ranking across models. These normalized values allow best-fit selector 318 to consistently rank candidate object models when constraint conditions vary across iterations.

In accordance with various embodiments, optimization metric log 334 includes metadata that specifies the rule set, evaluation function, and objective weighting applied at the time of metric calculation. For example, if zoning and regulatory ingestion module 306 introduces a new setback rule, optimization metric log 334 records the modified constraint profile alongside the recalculated performance scores. This metadata allows subsequent system components to distinguish between evaluations performed under different regulatory conditions.

Optimization metric log 334 may also support time-series tracking of evaluation outcomes. Iterative model renderer 310 may generate successive candidate object models with incremental adjustments, and optimization metric log 334 records the trajectory of performance scores across iterations. This time-series data enables optimization loop manager 314 to identify convergence patterns or diminishing returns in iterative adjustments.

In certain embodiments, optimization metric log 334 supports query and retrieval operations for both analytics and validation. For instance, an auditor may query the log for all candidate models exceeding a dimensional efficiency threshold of 0.9 under a given zoning dataset. Likewise, planning system interface 304 may retrieve the highest-ranked model and its associated metric record when generating project plans. Accordingly, optimization metric log 334 establishes structured support enabling computing performance values, recording constraint compliance, and ranking candidate object models. By storing machine-interpretable evaluation results linked to specific model identifiers and rule sets, optimization metric log 334 enables technical traceability of optimization workflows.

Process for Generating and Optimizing Schema-Conformant Object Models

Figure 4:
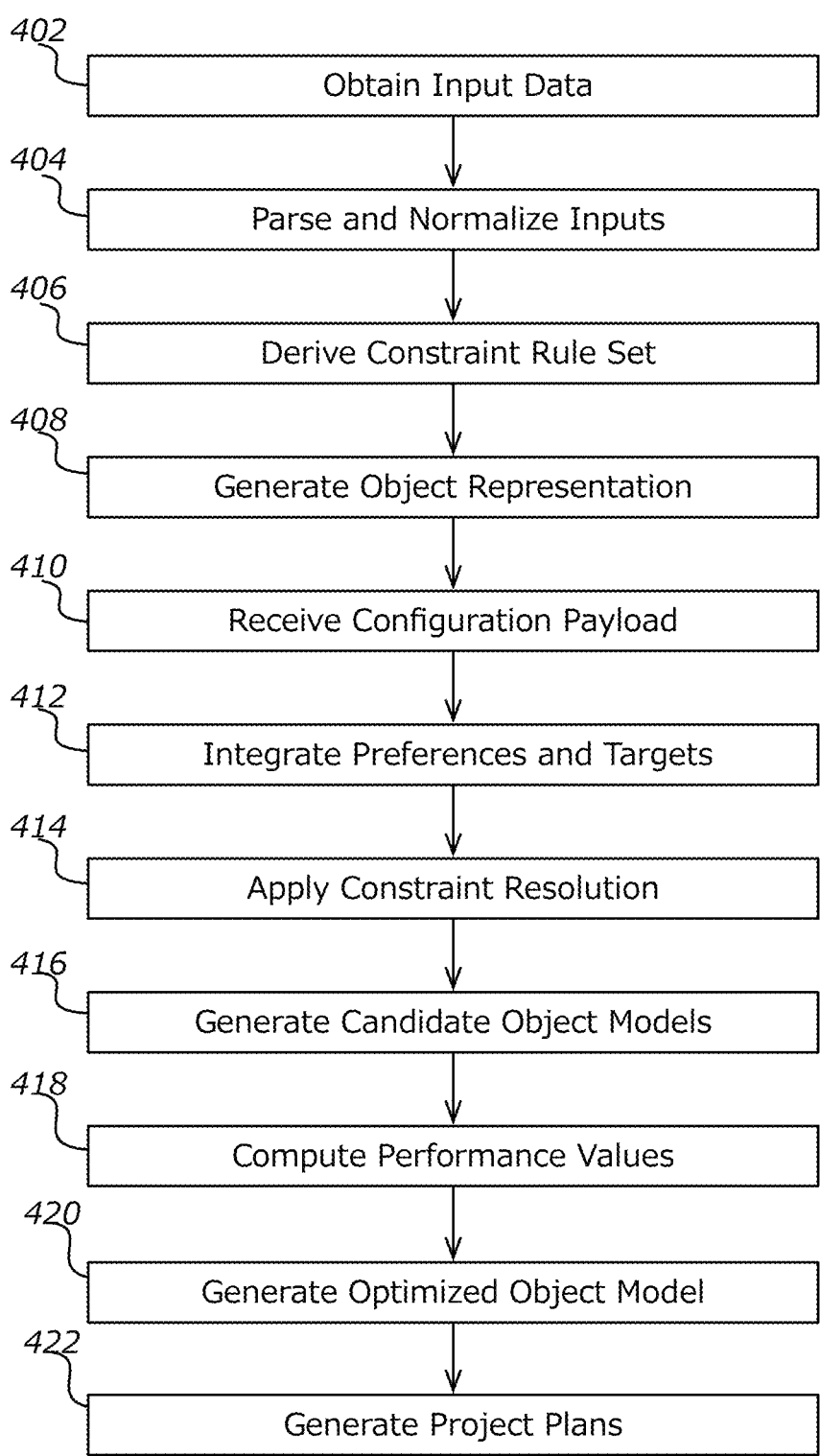
FIG. 4 illustrates an example process for generating and optimizing schema-conformant object models, in accordance with various embodiments.

FIG. 4 illustrates an exemplary process for generating and optimizing schema-conformant object models in accordance with various embodiments. The method steps or techniques depicted and described herein can be performed in a processor of the parametric design engine 103 or optimization engine 170 of FIG. 1, with the steps encoded as processor-executable instructions stored in a non-transitory memory of the respective system. In certain embodiments, one or more steps may be executed cooperatively across both engines, with parametric design engine 103 responsible for data ingestion and object representation generation, and optimization engine 170 responsible for iterative evaluation and optimization. The techniques of FIG. 4 may be implemented in software executed within a virtualized environment, an operating system kernel, or a dedicated library package bound into design applications. In further embodiments, the techniques may be implemented in hardware using a specially constructed machine, an application-specific integrated circuit (ASIC), or a field-programmable gate array (FPGA). The process may comprise additional steps, fewer steps, or a different order of steps without departing from the scope of the invention, as would be apparent to one of ordinary skill in the art.

At step 402, input data is obtained. The input data represents structured, semi-structured, or unstructured content received from user device(s) 102, third-party device(s) 111, or planning system 105 through parametric design engine interface 302 of FIG. 3. In various embodiments, input data may include zoning ordinances, dimensional surveys, environmental datasets, or material specifications. These inputs may be accompanied by metadata describing their origin, encoding, and retrieval context. More specifically, input data may be received through multiple channels including browser-based uploads, API calls, scraping routines, or scheduled synchronization tasks. Inputs may also be ingested from external repositories such as zoning and regulatory rules database 330, site context database 226, or material cost database 224. Each input is assigned a transaction identifier and paired with metadata including source identifier, timestamp, and encoding format. Initial integrity checks may be performed to validate file type, size, and encoding compatibility before forwarding the records for parsing.

For example, a user may upload a scanned survey plan through a web application. The input is transmitted via HTTPS POST to user device(s) interface 202, which extracts metadata including file type and user identifier, validates the encoding, and registers the transaction. In another example, zoning and regulatory ingestion module 306 may retrieve a set of municipal zoning rules from a government repository in XML format, attach ingestion metadata, and forward the rules for constraint derivation.

In certain embodiments, input data is normalized at intake to ensure consistent handling across diverse formats. Pre-tagging logic may assign provisional schema attributes based on headers, embedded metadata, or contextual patterns. For instance, dimensional units expressed in feet, meters, or mixed notation may be tagged with a canonical schema identifier representing measurement units. These pre-tags are stored alongside the transaction record and made available to subsequent modules, including spatial constraint analyzer 206 and schema mapper 210 of FIG. 2.

At step 404, the input data is parsed and normalized. The system applies machine-executed parsing logic within zoning and regulatory ingestion module 306 and coordinate & unit normalizer 205 of FIG. 2 to derive structured rule sets from heterogeneous input formats. Parsing logic refers to the machine-executed process of analyzing text, numerical tables, or geometric encodings and segmenting them into discrete tokens, fields, or attribute-value pairs. Normalization refers to the process of converting these tokens into schema-conformant constraint objects that can be consistently referenced in subsequent computations. More specifically, parsing operations may include tokenizing unstructured text into lexical units, applying grammar-based parsing rules to identify entities such as dimensional thresholds or setback restrictions, and mapping extracted elements into schema-defined attributes. Normalization processes may include resolving measurement units to a canonical scale, reformatting dimensional ranges into structured inequality expressions, and encoding adjacency conditions into graph-representable constraint objects. These steps ensure that heterogeneous and unstructured data are transformed into structured representations usable by parametric assembly generator 211 and constraint solver 219.

For example, a zoning ordinance expressed in free-text language (e.g., "no building within 15 feet of the street line") may be parsed into tokens [no] [building] [within] [feet] [of] [street line]. Grammar-based parsing logic maps "15 feet" to a dimensional offset parameter and "street line" to a contextual boundary object. Normalization then converts the measurement into a canonical internal unit (e.g., meters) and encodes the setback requirement as a constraint object of the form distance (Building, StreetLine)$\geq$4.57 m. In another example, an environmental dataset containing elevation points is normalized into a grid-based schema representation, with each point mapped to standardized coordinate reference systems to enable terrain-aware model generation.

In certain embodiments, parsing and normalization also address ambiguous or inconsistent encodings. For instance, the system may apply disambiguation routines to resolve terms like "floor area ratio" that appear in multiple regulatory contexts with jurisdiction-specific definitions. These routines may reference spatial grammar & intermediate representation schema repository 229, which stores canonical rule templates and transformation grammars, to ensure consistent mapping across jurisdictions.

At step 406, the system derives a constraint rule set from the normalized input data. Constraint rule sets refer to structured, machine-readable profiles that encode spatial relationships, dimensional limits, and regulatory conditions extracted during parsing. The derivation process is executed within schema mapper 210 and spatial constraint analyzer 206 of FIG. 2, which apply machine-executed logic to convert normalized tokens into enforceable computational rules.

In accordance with various embodiments, the derivation process includes: (1) propagating dimensional thresholds into schema attributes (e.g., maximum height, minimum floor area, or setback distance); (2) encoding adjacency restrictions into graph-based edges representing allowable or disallowed spatial relationships; and (3) transforming conditional provisions into Boolean or inequality expressions usable by constraint solver 219. These structured rules ensure that subsequent model generation operates under explicitly defined and verifiable constraints, rather than vague or narrative inputs.

For example, if a regulation states that "multi-unit dwellings must include at least one egress stairwell per 20 units," the system encodes this into a constraint rule object with parameters {unit_count÷20→stairwell_count$\geq$1}. Similarly, if zoning ordinances specify maximum lot coverage of 40%, the rule set encodes the allowable buildable footprint as BuildableArea$\leq$0.40×ParcelArea. These encoded rules are stored in a schema-conformant representation so that they can be applied during iterative model generation in step 410.

In certain embodiments, the derivation process includes resolving conflicts between overlapping constraints. For instance, a height restriction in a zoning code may conflict with a flood-elevation requirement derived from environmental data. The system may encode both constraints, mark the relationship as a conflict, and assign resolution priority using rule-weighting logic stored in spatial grammar & intermediate representation schema repository 229. This produces a unified constraint rule set that balances multiple input sources without manual intervention.

The derived constraint rule set is persisted in zoning and regulatory rules database 330 for reuse, cross-jurisdictional comparisons, and audit lineage. By encoding heterogeneous textual and numerical inputs into formal constraint objects, the system ensures that subsequent parametric assemblies and candidate models are generated within computationally verifiable boundaries.

At step 408, the system generates an object representation based on the structured rule set derived in step 406. The object representation refers to a schema-conformant digital model that encodes parametric assemblies of spatial components, where each assembly is defined by dimensional parameters, adjacency relationships, and constraint attributes. This process is executed within parametric assembly generator 211 and topology & adjacency graph manager 221 of FIG. 2, which convert abstract rule constraints into a structured object graph operable for iterative modification and evaluation.

In accordance with various embodiments, generation of the object representation comprises: (1) instantiating parametric assemblies (e.g., wall segments, floor plates, circulation zones) as nodes in a graph-based data structure; (2) encoding adjacency relationships as edges that define permissible or required connections between assemblies; and (3) binding assembly attributes such as length, area, or material class to schema-conformant fields aligned with spatial grammar & intermediate representation schema repository 229. These bindings ensure that the representation can be systematically modified and validated against constraints.

For example, a parcel input specifying a 50×100 foot lot with a 40% coverage constraint is encoded as an object representation containing a root parcel node with permissible buildable area$\leq$2000 square feet. Parametric assemblies corresponding to floor slabs, walls, and circulation elements are instantiated within that boundary, each linked by adjacency edges. Constraint attributes ensure that stairwell assemblies are attached to circulation cores and that façade elements respect setback rules defined in the structured rule set.

In certain embodiments, the object representation includes hierarchical nesting of assemblies to capture multilevel spatial structures. For instance, a multi-unit dwelling may be encoded as a parent node with child assemblies representing individual units, each containing room-level assemblies. Constraint inheritance propagates dimensional limits (e.g., maximum height per floor, minimum corridor width) across the hierarchy, ensuring compliance at multiple scales without duplicating constraint logic.

The generated object representation is persisted as an intermediate state in candidate model repository 332, where it serves as the baseline framework for subsequent generation of candidate object models in step 410. By representing spatial assemblies as schema-conformant objects with explicit adjacency and constraint bindings, the system enables automated reasoning over structural feasibility and optimization potential.

At step 410, the system receives a configuration payload that specifies user-defined parameters, design preferences, or selection criteria to be applied during object model generation. The configuration payload is transmitted from user device(s) 102 or third-party device(s) 111 via design configurator interface 104 and user device(s) interface 202, and is registered within parametric design engine 103 for subsequent processing. The configuration payload may include constraint overrides, target dimensional ranges, adjacency preferences, or material selections expressed in structured or semi-structured formats.

In accordance with various embodiments, receiving the configuration payload comprises: (1) parsing configuration files provided in standardized exchange formats such as JSON, XML, or IFC; (2) validating parameter entries against schema-conformant fields defined in spatial grammar & IR schema repository 229; and (3) registering configuration values as priority constraints or optimization targets within optimization engine interface 217. Each payload entry is tagged with a unique identifier and transaction timestamp to ensure reproducibility across optimization runs.

For example, a configuration payload may specify that a residential model include at least three bedrooms, a maximum floor area ratio of 0.5, and a preference for south-facing windows. These values are parsed, validated, and bound to corresponding schema attributes in the object representation generated in step 408. If a user specifies a maximum budget constraint, the system links this entry to material cost database 224, ensuring that subsequent candidate models remain within the cost envelope during optimization.

In certain embodiments, the configuration payload incorporates approval or review inputs captured interactively through design configurator interface 104. For instance, a contractor may approve a preliminary layout but adjust corridor width or structural span ranges, which are re-encoded as updated constraint values. These updates are logged and synchronized with candidate model repository 332 to provide a reproducible lineage of configuration-driven refinements. Accordingly, by integrating configuration payloads with structured rule sets and object representations, the system enables iterative model generation that reflects both external regulatory constraints and user-specific design objectives, ensuring that candidate object models generated in subsequent steps satisfy the combined constraint set.

In step 412, the system integrates user preferences and optimization targets into the schema-conformant object representation. The configuration payload received in step 410 is parsed and transformed into constraint objects, which are then combined with the structured rule set derived in step 406. This integration is executed within schema mapper 210 and constraint solver 219, which register the user selections as structured parameters alongside zoning, regulatory, and site-specific rules.

In accordance with various embodiments, integrating preferences and targets comprises: (1) normalizing preference parameters into schema-conformant fields (e.g., a "three bedroom" selection mapped into a cardinality constraint on parametric room assemblies), (2) propagating adjacency preferences into the topology graph (e.g., encoding "kitchen adjacent to living room" as an edge constraint), and (3) binding performance targets to evaluation criteria (e.g., "maximize daylight" linked to orientation metrics). The combined constraint set is stored with transaction identifiers to ensure reproducibility and is registered with candidate model repository 332 for subsequent iterative generation.

For example, a configuration payload specifying "garage on north side" and "minimum corridor width 3 feet" is parsed into spatial constraint objects. These objects are linked to the site context database 226 to verify orientation feasibility and to the spatial grammar & IR schema repository 229 to ensure corridor assemblies respect minimum dimension requirements. The combined constraints are then applied to the object representation so that any candidate object model generated in later steps inherently satisfies both regulatory and preference-driven conditions. Accordingly, by integrating user-defined selections and optimization targets into the same structured rule set that encodes zoning and regulatory requirements, the system ensures that subsequent candidate object models reflect both external compliance and individualized objectives within a single machine-executable framework.

In step 414, the system applies constraint resolution logic to the schema-conformant object representation in order to enforce compliance during model generation. Constraint solver 219 executes machine-enforced propagation of dimensional limits, adjacency requirements, and user preference parameters across parametric assemblies, updating object attributes and relationships until all active constraint objects are satisfied or flagged for conflict.

In accordance with various embodiments, applying constraint resolution comprises: (1) propagating dimensional parameters across connected assemblies in the adjacency graph, such that modifying a wall length automatically adjusts attached floor and ceiling assemblies; (2) reconciling overlapping or conflicting constraints by prioritizing rule weights or invoking satisfiability-solving routines; and (3) validating updated assemblies against regulatory database 222 and site context database 226 to ensure compliance with zoning, setback, or orientation rules.

For example, when a configuration payload specifies a minimum corridor width of 36 inches, constraint solver 219 enforces this condition across all corridor assemblies by adjusting connected wall assemblies and rebalancing room dimensions. If a conflicting constraint is present—such as a maximum lot coverage from zoning rules—the system resolves the conflict by prioritizing regulatory coverage limits and adjusting corridor placement or room adjacency relationships until both requirements are satisfied.

In certain embodiments, constraint resolution includes iterative validation loops. Each modification to the object representation is logged with associated constraint identifiers, enabling candidate model repository 332 to record which constraints were satisfied, which required relaxation, and which produced conflicts. This lineage ensures that subsequent model evaluations are traceable and reproducible across optimization runs. Accordingly, through the execution of constraint resolution, the schema-conformant object representation is transformed into a constraint-compliant baseline that can be used for iterative generation of candidate object models in step 416.

In one operational sequence, constraint processing proceeds as follows. At the outset, constraint objects are compiled from parsed inputs (e.g., zoning ordinances, setback thresholds, adjacency requirements) and preference parameters received in the configuration payload. Each constraint object is encoded with a type identifier, priority weight, and evaluation method stored in spatial grammar & IR schema repository 229. In an embodiment, each constraint object's evaluation method references a machine-executable routine (e.g., a callable rule function or solver predicate) that consumes current assembly attributes and adjacency state and returns a boolean or scalar residual used by constraint solver 219 during propagation, conflict detection, and resolution.

Constraints can then be propagated across the schema-conformant object representation. Propagation routines traverse the adjacency graph and update dimensional, adjacency, and orientation attributes so that a constraint applied to one assembly is reflected in connected assemblies. In an embodiment, propagation executes a topologically ordered update over the graph; each node recomputes affected parameters from predecessor deltas and caches residuals used by constraint solver 219 to determine convergence. For example, a minimum corridor width propagates into connected wall segments and attached room assemblies, causing parametric attributes to adjust in concert.

The system detects conflicts between constraint objects that cannot be jointly satisfied under the current configuration. In an embodiment, constraint solver 219 performs satisfiability checks and graph traversals across the adjacency graph to identify violations where dimensional, regulatory, or preference-driven conditions overlap. For example, a maximum height restriction derived from zoning rules may conflict with a minimum elevation requirement extracted from environmental datasets. In another example aligned with lot-coverage constraints, a "maximum 40% coverage" rule applied to a 50×100-foot parcel (5,000 sq ft) yields: Candidate A (three-bedroom ADU footprint) with computed coverage of 48%→non-compliant; Candidate B (two-story compact variant) with computed coverage of 36%→compliant. The solver records Candidate A with a penalty weight or disqualification flag and marks Candidate B as eligible. These conflict-detection outcomes are encoded as lineage entries in candidate model repository 332, ensuring that tradeoffs (e.g., coverage vs. minimum room count) are explicit and traceable by performance metric calculator 316 and best-fit selector 318.

Following conflict detection, the system ranks constraints according to a defined hierarchy stored in spatial grammar & IR schema repository 229. Jurisdictional rules and safety-related provisions receive highest priority, followed by user-defined preferences and optimization heuristics. This ranking enables constraint solver 219 to determine which constraints require strict enforcement and which may be adjusted within tolerances during subsequent iterations.

Once ranked, the system resolves conflicts using machine-executed strategies that either adjust lower-priority constraint values within tolerance ranges or branch the object representation into parallel candidates embodying different tradeoffs. For instance, a corridor-width preference may be adjusted from 4.0 ft to 3.5 ft where permitted by applicable rules, while a conflicting setback rule remains strictly enforced. Alternatively, two candidates may be produced: one satisfying the coverage constraint by reducing room count, and another maintaining room count with higher coverage. Both candidates are stored in candidate model repository 332 with lineage tags recording the specific adjustment or branching decision.

In certain embodiments, the resolution process is iterative. Resolved candidates are fed into generation orchestrator 225 for continued modification and evaluation. Each iteration records updated adjacency graphs, constraint satisfaction states, and evaluation metrics in candidate model repository 332 and optimization metric log 334. This iterative cycle allows the system to explore multiple design pathways, quantify the impact of constraint relaxations, and ensure that surviving candidates are both schema-conformant and traceable through recorded decision history.

In step 416, the system generates candidate object models by iteratively modifying the schema-conformant object representation under the structured rule set. Generation orchestrator 225 coordinates parametric assembly generator 211, topology and adjacency graph manager 221, and optimization loop manager 314 to create multiple variants of the object representation, each reflecting alternative spatial arrangements, dimensional adjustments, or adjacency configurations.

In accordance with various embodiments, generating candidate object models comprises: (1) repositioning spatial components within allowable adjacency constraints, such as shifting the location of a stair assembly to alter circulation patterns; (2) adjusting dimensional parameters within regulated limits, such as resizing bedrooms or modifying corridor lengths; and (3) reconfiguring adjacency relationships, such as altering which rooms share a boundary or which assemblies connect to structural cores. Each modification is validated in real time by constraint solver 219 to ensure compliance with both system-ingested rules and user-defined preferences.

For example, given an object representation of a residential floor plate, the system may generate a first candidate with bedrooms oriented north-south, a second candidate with bedrooms oriented east-west, and a third candidate with an alternate corridor alignment. Each candidate is derived by reconfiguring adjacency graphs and adjusting dimensional values, while maintaining compliance with setback rules, lot coverage constraints, and minimum corridor widths.

In certain embodiments, candidate object models are generated through stochastic or heuristic search routines that explore design space efficiently. For instance, optimization loop manager 314 may apply randomized initial placements, followed by iterative refinement using rule-based pruning and metric feedback. Each resulting candidate is stored in candidate model repository 332 along with metadata describing the applied modifications and constraint satisfaction outcomes. Accordingly, by generating a plurality of candidate object models, the system ensures that subsequent evaluation and selection steps operate on a diverse set of constraint-compliant design alternatives, enabling quantitative comparison of spatial efficiency, material usage, and other performance metrics.

In step 418, the system computes performance values for the candidate object models using machine-executed evaluation logic. Performance metric calculator 316 evaluates each candidate model against quantitative measures of spatial efficiency, material usage, and constraint compliance. These computations transform the parametric attributes and adjacency relationships of each model into measurable values that can be compared across alternatives.

In accordance with various embodiments, computing performance values comprises: (1) quantifying spatial efficiency by analyzing circulation paths, usable floor area ratios, and adjacency graph density; (2) calculating material usage by traversing parametric assemblies to extract surface area, volume, and material-class attributes cross-referenced against material cost database 224; and (3) validating constraint compliance by applying rule-based validation logic that checks adherence to zoning, dimensional, and user-defined constraints derived in steps 406 and 412.

For example, a candidate model may yield a circulation efficiency score of 0.85 by comparing net usable space to total floor area, a material usage estimate of 2,000 square feet of concrete and 1,200 square feet of glazing, and a compliance score indicating successful adherence to a 40% lot coverage rule and a three-bedroom requirement. These values are normalized into a unified schema and stored with candidate identifiers in optimization metric log 334.

In certain embodiments, performance computation includes weighted objective functions that combine multiple values into composite scores. For instance, user preferences in the configuration payload may prioritize daylight exposure over material efficiency, causing performance metric calculator 316 to apply higher weighting to orientation-based metrics during evaluation. Accordingly, by computing performance values for each candidate object model, the system produces structured quantitative data that enables best-fit selector 318 to identify an optimized object model in step 420.

In step 420, the system generates an optimized object model based on the computed performance values. Best-fit selector 318 evaluates the quantitative outputs from performance metric calculator 316 and identifies the highest-ranking candidate object model that satisfies constraint conditions and preference parameters. The optimized object model is recorded as the selected schema-conformant object representation that achieves the best balance among efficiency, compliance, and user-defined targets.

In accordance with various embodiments, generating the optimized object model comprises: (1) ranking candidate object models by composite performance score, where scores are calculated by applying weighted objective functions across spatial efficiency, material usage, and compliance metrics; (2) selecting the candidate with the highest composite score, or a set of top-ranked candidates if tie conditions occur, in which case deterministic tie-break rules (e.g., larger compliance margin, lower material usage, higher circulation efficiency) are applied; and (3) finalizing the optimized object model by binding it to transaction metadata, constraint satisfaction logs, and version identifiers stored in candidate model repository 332.

For example, if five candidate object models are generated, the system may calculate composite scores of 0.72, 0.81, 0.85, 0.79, and 0.83. The model with score 0.85 is selected as the optimized object model. This selected model contains parametric assemblies representing compliant spatial components, adjacency graphs ensuring circulation and access requirements, and constraint bindings that encode both zoning limitations and user preferences such as room adjacencies.

In certain embodiments, generation of the optimized object model includes secondary validation checks. For instance, before finalization, constraint solver 219 re-applies the combined constraint set to verify that no violations were introduced during performance evaluation or ranking. If discrepancies are detected, the best-fit selector 318 may re-rank the remaining candidates to ensure compliance. Accordingly, in accordance with various embodiments, the optimized object model serves as the technical basis for subsequent generation of project plans in planning system 105. Attributes from the object model are exported to planning system interface 304, where they are transformed into construction-ready technical outputs including drawings, material schedules, and installation sequencing instructions.

In step 422, the system generates project plans from the optimized object model. Planning system 105 receives the finalized schema-conformant representation via planning system interface 304 and transforms it into structured technical artifacts comprising construction drawings, material specifications, and scheduling instructions. The transformation is executed by parsing parametric assemblies, adjacency graphs, and material attributes encoded in the optimized object model and compiling them into domain-specific formats suitable for construction workflows.

In accordance with various embodiments, generating project plans comprises: (1) extracting geometric assemblies from the optimized object model and converting them into two-dimensional and three-dimensional drawings aligned with industry exchange standards such as IFC or DWG; (2) traversing material attributes to assemble a bill of materials, with quantities calculated by aggregating surface areas and volumes against material cost database 224; and (3) generating scheduling instructions by associating assembly dependencies and adjacency relationships with temporal sequencing logic, which may be aligned with construction trade order or staffing optimization routines. In certain embodiments, planning system 105 also emits permit-submission artifacts-such as code-compliance annotation sheets, plan sets with indexed ordinance cross-references, and jurisdiction-specific cover sheets-derived from the same constraint bindings used during model generation.

For example, a selected optimized object model may include assemblies for walls, slabs, and circulation elements encoded with dimensional parameters and material classes. Planning system 105 extracts these attributes to generate structural drawings showing wall layouts and slab reinforcement details, compiles a bill of materials listing required cubic yards of concrete and square footage of glazing, and produces a construction sequence indicating when framing must precede installation of mechanical assemblies. These artifacts are serialized into schema-conformant outputs that can be shared with third party device(s) 111. In an embodiment, where required, these outputs are packaged as permit-ready plan sets that include code references, indexed constraint evidence, and sheet lists suitable for electronic submittal.

In certain embodiments, project plan generation includes simulation or visualization overlays. For instance, planning system 105 may use the spatial instruction compiler 215 to generate animated sequencing views of structural assembly or to output digital staging files for use in augmented-reality construction aids. In further embodiments, project plans incorporate constraint validation metadata, enabling inspectors or contractors to verify that regulatory and zoning compliance requirements remain satisfied in the generated plans.

Figure 5:
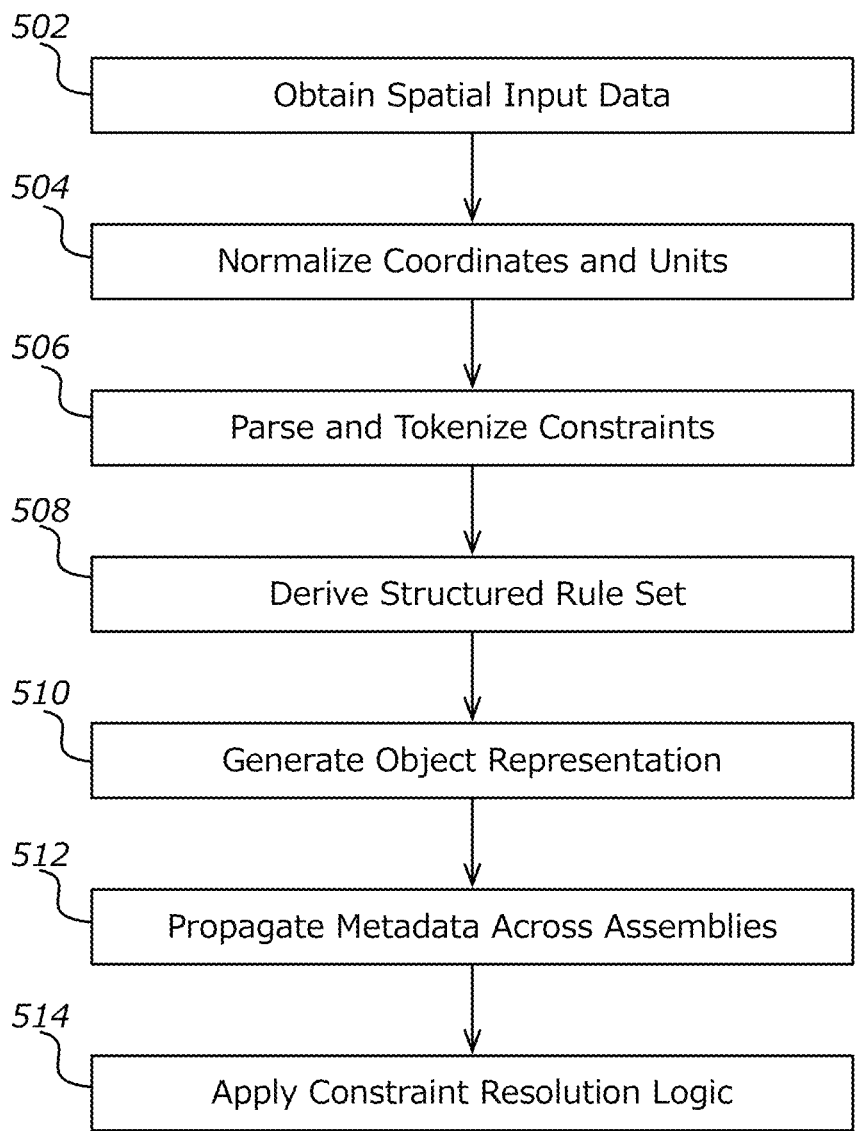
FIG. 5 illustrates an example process for generating schema-conformant object representations, in accordance with various embodiments.

In an embodiment, planning system 105 may create a visual representation of the construction site, incorporating topographical details and existing structures such as roads, utilities, or nearby buildings, as well as natural features such as slopes, rivers, or tree lines. These contextual features may be drawn from site context database 226 and overlaid with the optimized object model to produce integrated construction drawings that account for real-world site conditions. In certain embodiments, adjacent properties and potential obstructions are also encoded into the project plans, enabling precise coordination of construction activities within constrained environments. Accordingly, by generating project plans directly from the optimized object model, the system ensures that construction artifacts are both constraint-compliant and aligned with user selections, enabling traceability between high-level configuration payloads, object-level representations, and final technical deliverables. Process for Generating Schema-Conformant Object Representations FIG. 5 illustrates an example process for generating schema-conformant object representations, in accordance with various embodiments. The steps of FIG. 5 correspond to sub-processes within the process of FIG. 4, including how spatial input data is normalized, constraint tokens are parsed into structured objects, object representations are generated, and metadata is propagated before constraint resolution is applied. The operations may be performed by processor-executable instructions within parametric design engine 103 of FIG. 2, and may be implemented in software, hardware, or a combination thereof.

In step 502, the system obtains spatial input data from a plurality of data sources. The spatial input data may comprise structured representations such as geospatial tables or CAD boundary files, semi-structured representations such as XML or JSON zoning specifications, and unstructured representations such as free-form regulatory text, PDF survey reports, or scanned plot diagrams. Parametric design engine interface 302 coordinates this ingestion by receiving payloads from user device(s) 102, third-party device(s) 111, or external databases connected through network 150. In accordance with various embodiments, obtaining spatial input data comprises: (1) scraping regulatory repositories to retrieve ordinance text in HTML or PDF formats; (2) accessing GIS or cadastral systems to obtain plot boundaries encoded in shapefiles or GeoJSON; (3) querying material and environmental datasets to collect parameters such as soil bearing capacity, wind exposure categories, or climate zone identifiers; and (4) processing direct uploads from user device(s) 102, including dimensional surveys, annotated site maps, or preference files. Each input is tagged with source identifiers, encoding type, and transaction timestamps to ensure reproducibility and traceability within parametric design engine 103. For example, the system may receive a scanned site plan in PDF format uploaded via design configurator interface 104, which is tagged as unstructured raster input with a unique transaction identifier. In parallel, a GeoJSON parcel file may be retrieved from a municipal GIS server, providing precise coordinate boundaries for the same parcel. Metadata for both sources is registered, and the files are queued for coordinate and unit normalization in step 504.

In step 504, the system normalizes coordinates and measurement units across the heterogeneous spatial input data to establish a consistent reference framework. Coordinate and unit normalizer 205 of parametric design engine 103 performs this operation by applying schema-conformant transformation rules to align disparate coordinate systems, projections, and measurement units into a standardized internal format. In various embodiments, normalization includes: (1) converting survey data expressed in feet or yards into SI units such as meters using machine-executed conversion logic; (2) reconciling geospatial inputs from different projections, such as WGS84 versus NAD83, by applying affine transformations or reprojection matrices; (3) adjusting for local datum offsets by referencing control points retrieved from site context database 226; and (4) resolving angular measurements (e.g., bearings, azimuths) into canonical directional vectors. The normalization process ensures that subsequent modules such as spatial constraint analyzer 206 and plot configuration generator 308 can operate on a unified representation of spatial attributes. For example, a cadastral file may specify parcel boundaries in state plane coordinates, while a user-uploaded site plan specifies building offsets in feet from a property line. Coordinate and unit normalizer 205 converts both to a unified Cartesian grid in meters, adjusting scaling factors and applying translation offsets derived from anchor points. The resulting normalized dataset preserves lineage metadata, including original unit specifications and applied transformation coefficients, which are logged for audit and retraceability.

In step 506, the system parses and tokenizes zoning and regulatory constraints obtained from zoning and regulatory ingestion module 306 to prepare them for structured application against object models. The parsing process applies grammar-based recognition and rule-based segmentation to transform unstructured or semi-structured regulatory texts into discrete machine-readable tokens. Each token corresponds to an elemental constraint, such as minimum lot frontage, maximum floor-to-area ratio, or required side-yard setback, which is mapped into schema attributes maintained in spatial grammar and IR schema repository 229. In certain embodiments, the parsing logic performs lexical analysis to identify regulatory keywords, numerical thresholds, and conditional operators. Detected tokens are normalized into canonical constraint objects that include identifier labels, unit-standardized values, and logical operators (e.g., $\leq$, $\geq$, $=$). The system applies contextual tagging to distinguish between zoning classifications (e.g., R-1 residential versus C-2 commercial), temporal provisions (e.g., rules effective after a specific date), and jurisdictional applicability. For example, when processing a municipal zoning ordinance expressed in PDF form, zoning and regulatory ingestion module 306 extracts the text and converts "Side setback: 10 ft. minimum" into a constraint object specifying {attribute: side_setback, operator: $\geq$, value: 3.048 meters}. In another case, a development regulation may specify "Floor-to-area ratio shall not exceed 0.4." This is tokenized into {attribute: FAR, operator: $\leq$, value: 0.4} and logged with jurisdictional metadata for contextual enforcement. Parsed and tokenized constraints are stored as structured rule set entries in zoning and regulatory rules database 330. Each entry is cross-referenced with the originating ordinance identifier and transformation lineage, allowing the constraint set to be applied directly by constraint solver 219 or threshold evaluator 312 during model generation and evaluation.

In step 508, a structured rule set is derived from the parsed and tokenized constraint data. The parametric design engine 103 applies schema mapping and constraint translation logic to convert individual tokens into machine-readable constraint objects, each object encapsulating a specific condition such as a dimensional limit, adjacency requirement, or regulatory provision. These constraint objects are then aggregated into a structured rule set that defines enforceable spatial relationships and governing conditions for subsequent model generation. In certain embodiments, tokens produced in step 506 are assigned to object classes using the schema mapper 210 of FIG. 2, which aligns the tokens with predefined schema attributes stored in spatial grammar and IR schema repository 229. For example, a parsed phrase such as "minimum lot setback of 20 feet" is mapped into a constraint object comprising a dimensional parameter attribute (20 feet), a spatial direction attribute (front lot line), and a compliance tag linking it to the applicable zoning code. The structured rule set consolidates these constraint objects into a formal intermediate representation, enabling the constraint solver 219 to later enforce them during model generation. For example, a zoning regulation requiring "two off-street parking spaces per dwelling unit" may be tokenized into a count attribute ("2"), a classification attribute ("parking"), and a dependency attribute ("per dwelling unit"). These attributes are mapped into a structured constraint object and incorporated into the structured rule set alongside other constraints such as floor area ratios or maximum building height. The structured rule set thereby represents a comprehensive, schema-conformant specification of all applicable constraints to be enforced by the system during parametric assembly and optimization.

In step 510, the system generates a schema-conformant object representation comprising parametric assemblies of spatial components, each bound with constraint attributes derived from the structured rule set. Parametric design engine 103 assembles parametric objects corresponding to building components, including walls, rooms, corridors, and utilities, each defined by schema-conformant attributes. These objects are combined into a coherent spatial model framework that encodes both geometric characteristics and constraint-aware relationships among the components. In certain embodiments, object representations are generated using parametric assembly generator 211, which instantiates object classes from component library database 220 and binds them with constraint attributes from the structured rule set. For example, a "kitchen module" object may be instantiated with fixed adjacency to plumbing nodes and minimum clearance distances defined by regulatory database 222. Similarly, a "bedroom module" object may include dimensional parameters for floor area, window placement, and egress requirements, each tagged with constraint metadata to enforce compliance during later optimization. For example, if the structured rule set specifies "a garage must be located adjacent to a driveway and below maximum height H," the system generates a garage object representation with adjacency links to driveway objects and dimensional attributes bounded by the height threshold. These representations form the foundational framework upon which iterative modification and optimization are performed, ensuring that each object remains schema-conformant and constraint-aware from its initial instantiation.

In step 512, metadata and constraint attributes are propagated across the assemblies of the generated object representation. Parametric design engine 103 applies schema-conformant propagation logic to ensure that dimensional limits, regulatory tags, and adjacency attributes extend consistently through interconnected spatial components. Each parametric assembly inherits constraint objects from the structured rule set and applies them to associated nodes and edges of the representation graph, enabling machine-executed validation at multiple levels of granularity. In certain embodiments, the propagation includes dimensional metadata such as height, width, and clearance parameters, which are applied across all components linked by adjacency relationships. For example, if a user preference specifies a minimum hallway width, the constraint attribute is propagated across assemblies defining circulation paths, and conflicting dimensions are automatically flagged. Similarly, regulatory metadata such as fire safety egress requirements may be attached to assemblies representing doors, corridors, or staircases, and these attributes are extended across dependent assemblies to ensure compliance. For example, when a bathroom assembly is instantiated with a plumbing clearance attribute, the metadata propagator ensures that adjacent wall assemblies inherit the clearance zone and that any intersecting structural assemblies are evaluated for conflicts. In another example, if zoning rules restrict maximum floor area ratio, the metadata propagator assigns a global constraint attribute to all room assemblies, allowing cumulative calculations across the entire representation. In various embodiments, propagated metadata is encoded into the intermediate representation schema maintained by spatial grammar and IR schema repository 229. This ensures that assembly attributes are not only enforced during constraint resolution but also preserved for optimization engine 170 and planning system 105, where they inform candidate model generation, performance evaluation, and construction plan compilation.

In step 514, the system applies constraint resolution logic to the propagated assemblies. Parametric design engine 103 executes machine-enforced resolution routines that evaluate adjacency relationships, dimensional attributes, and inherited regulatory metadata to enforce compliance with the structured rule set. This step ensures that the schema-conformant object representation remains internally consistent while accommodating both user preferences and external constraints. In certain embodiments, constraint resolution is performed using graph-based solvers that traverse adjacency structures, apply dimensional propagation, and adjust conflicting parameters. For example, if a bedroom assembly encroaches on a required egress path, the solver repositions the spatial component to satisfy minimum clearance requirements without violating other adjacency relationships. Constraint resolution may also include iterative recalculations of dependent assemblies, such as resizing a living room to maintain proportional relationships after modifying the attached hallway. In one example, a zoning rule requiring setbacks from the property line is enforced by translating spatial components within the plot configuration until the setback distance is satisfied. The solver adjusts affected assemblies such as exterior walls and boundary fences while ensuring that attached interior assemblies shift proportionally. In another example, structural load-bearing requirements may trigger automatic reinforcement of wall assemblies when a new upper-level room assembly is instantiated. Constraint resolution maintains the schema-conformant object representation in a constraint-enforced state, enabling subsequent candidate model generation and performance evaluation.

Process for Optimizing Candidate Object Models

Figure 6:
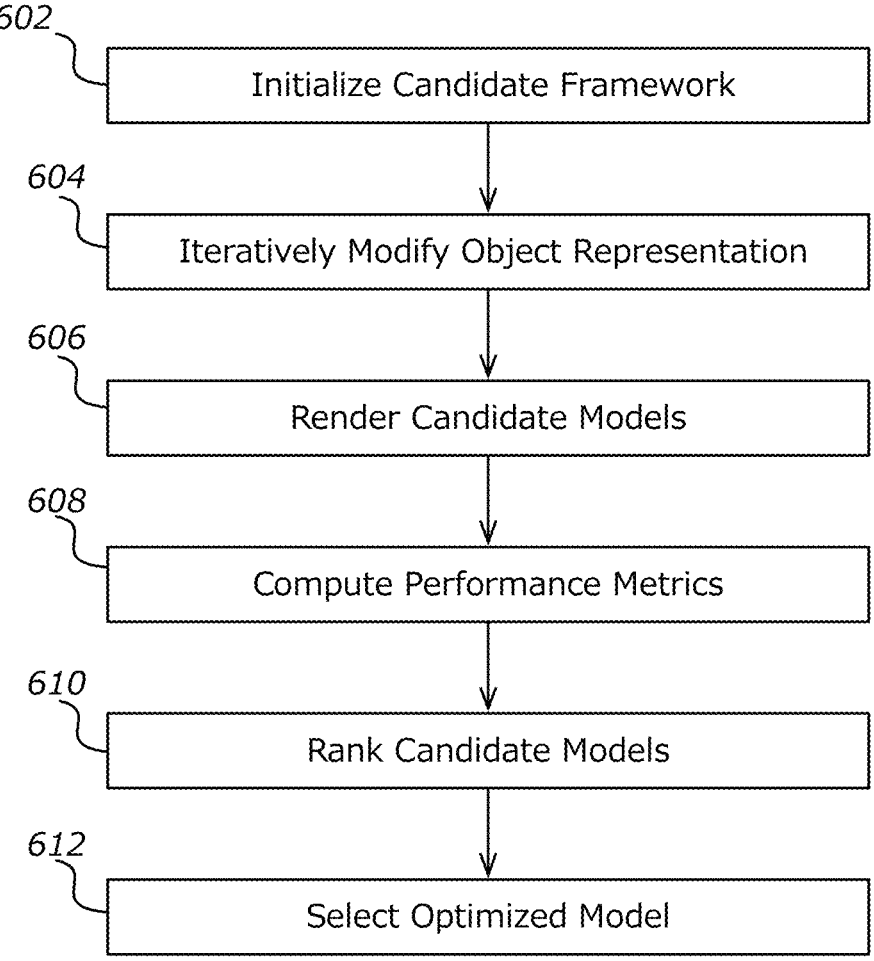
FIG. 6 illustrates an example process flow for optimizing candidate object models, in accordance with various embodiments.

FIG. 6 illustrates an example process for optimizing candidate object models, in accordance with various embodiments. The steps of FIG. 6 expand on processes introduced in FIG. 4, specifically focusing on iterative model generation, evaluation against performance metrics, and best-fit selection. The operations may be performed by processor-executable instructions within optimization engine 170 or parametric design engine 103 of FIG. 2, and may be implemented in software, hardware, or a combination thereof. The process may include additional steps, fewer steps, or steps arranged in a different order as would be apparent to a person of ordinary skill in the art.

In step 602, the system initializes a candidate modeling framework based on the constraint-enforced object representation generated in prior steps. Optimization engine 170 loads the schema-conformant object representation into a data structure configured to support iterative modification and evaluation. The initialization process prepares parametric assemblies, adjacency graphs, and inherited constraint objects for duplication and controlled variation, ensuring that each candidate model is generated from a validated baseline representation. In accordance with various embodiments, initialization comprises allocating memory structures for parametric assemblies, registering adjacency matrices that define spatial relationships, and binding constraint attributes to the relevant assemblies. These operations ensure that each candidate model generated during later iterations retains compliance with dimensional limits, adjacency requirements, and regulatory metadata. For example, the system may initialize a candidate framework by instantiating a living space assembly with inherited setback requirements, binding adjacency links to corridor assemblies, and tagging the resulting nodes with clearance constraints. This initialized framework serves as the foundation upon which alternative configurations are constructed. In certain embodiments, initialization may involve generating lineage identifiers that track the origin of each candidate model relative to the baseline representation. These identifiers are stored in candidate model repository 332 and linked to optimization metric log 334, allowing the system to maintain traceability between generated candidates and their originating schema-conformant object representation. For example, if a zoning ordinance requires a minimum 20-foot front setback, the initialized framework incorporates this rule at the root of the representation tree, and all candidate models generated in subsequent iterations inherit this constraint automatically. This ensures that optimization engine 170 does not produce candidate models that deviate from foundational compliance requirements.

In step 604, the system iteratively modifies the constraint-enforced object representation to generate candidate object models. Optimization engine 170 applies machine-executed modification routines to parametric assemblies, adjacency graphs, and dimensional attributes in accordance with the structured rule set derived in prior steps. The iterative process enables controlled variation of spatial components while preserving schema conformity, thereby producing a diverse set of candidate object models for subsequent evaluation. In various embodiments, iterative modification comprises repositioning spatial components within allowable boundaries, adjusting dimensional parameters within constraint ranges, and reconfiguring adjacency relationships while preserving connectivity rules. For example, a corridor assembly may be shifted laterally within a plot boundary, a bedroom assembly may be expanded to meet a minimum floor area requirement, or adjacency links between a garage and driveway assembly may be reconfigured to evaluate alternative orientations. Each modification is automatically validated against inherited constraints to ensure that generated models remain compliant with zoning, regulatory, and user-specified conditions. In certain embodiments, the system employs stochastic or deterministic iteration strategies to explore the solution space. Stochastic approaches may include randomized perturbations of dimensional parameters or probabilistic reassignment of adjacency links, while deterministic approaches may systematically vary parameters in increments defined by constraint thresholds. For instance, optimization loop manager 314 may instruct parametric assembly generator 211 to generate five alternative layouts by incrementally shifting the kitchen assembly along a grid axis, while simultaneously adjusting associated plumbing assemblies to maintain adjacency compliance. In an embodiment, each generated variant is instantiated as a candidate object model and registered with lineage identifiers linking it to the baseline framework established in step 602. Candidate models may be serialized into intermediate representations comprising geometry, adjacency graphs, and constraint metadata, and persisted in candidate model repository 332. For example, a set of ten candidate models may be created for a residential lot by varying living room orientation, room adjacencies, and circulation paths, all while maintaining minimum setback distances and floor-to-area ratio constraints. These candidate models are then queued for performance evaluation in step 608.

In step 606, the system renders candidate object models generated during iterative modification into structured representations suitable for evaluation. Optimization engine 170 compiles parametric assemblies, adjacency graphs, and constraint attributes into schema-conformant object models that encode both geometric details and metadata necessary for quantitative analysis. Rendering establishes a complete candidate instance with sufficient fidelity for metric calculation and rule enforcement. In various embodiments, rendering comprises translating parametric definitions into geometric primitives, resolving adjacency links into graph edges, and attaching constraint tags as metadata fields. For example, a wall assembly may be rendered as a polygonal surface with dimensional attributes encoded in meters, adjacency edges connecting to adjacent room assemblies, and constraint tags specifying minimum fire-resistance ratings. Similarly, circulation assemblies may be instantiated with vector-based path attributes, allowing later evaluation of circulation efficiency and egress compliance. In certain embodiments, the system leverages geometry-kernel adapter 223 to convert high-level parametric instructions into low-level geometry suitable for consistency checks and visualization. This includes resolving topological entities such as vertices, edges, and faces, and ensuring compatibility with both analysis routines and external CAD or BIM environments. For example, when rendering a candidate model that includes an angled roof assembly, geometry-kernel adapter 223 converts the parametric slope definition into a triangulated surface mesh, embedding adjacency references for structural analysis. In an embodiment, each rendered candidate object model is stored in candidate model repository 332 with associated metadata, including transaction identifiers, applied constraints, and transformation lineage. In one example, a candidate design variant for a multi-unit dwelling may include three rendered alternatives of stairwell placement, each encoded with adjacency graphs linking units to shared circulation paths. These variants are logged as distinct candidate models, each inheriting compliance tags from zoning and regulatory rules database 330, and are prepared for quantitative evaluation in step 608.

In step 608, the system computes performance metrics for each rendered candidate object model. Optimization engine 170 applies machine-executed evaluation logic that quantifies spatial efficiency, material utilization, and constraint compliance. These metrics provide objective measures that allow candidate models to be compared against one another within a normalized evaluation framework. In various embodiments, performance metric calculator 316 executes rule-based and numerical analyses across the assemblies of a candidate object model. Spatial efficiency may be quantified by calculating circulation path lengths, usable floor area ratios, or adjacency satisfaction rates between functional assemblies. Material utilization may be evaluated by aggregating surface areas, volumes, and structural attributes derived from component library database 220 and material cost database 224. Constraint compliance is validated by checking inherited regulatory tags against zoning and regulatory rules database 330 to ensure that dimensional limits, setback requirements, or usage restrictions are satisfied. For example, the system may evaluate a candidate model of a residential plot by computing total habitable square footage, verifying that side-yard setbacks meet minimum clearance requirements, and calculating the total volume of concrete required for the foundation. If a zoning rule specifies that circulation space cannot exceed 15% of gross floor area, the system calculates circulation efficiency by dividing corridor area by gross floor area and flags non-compliant models. In certain embodiments, computed metrics are normalized into comparable objective scales to enable ranking across heterogeneous candidates. For instance, spatial efficiency may be scored on a 0-1 scale, material usage may be expressed as a cost index, and compliance may be represented as a binary pass/fail value. These normalized performance metrics are stored in optimization metric log 334 alongside lineage identifiers, ensuring traceability between each candidate model, its computed values, and the constraint conditions applied during evaluation. In one scenario, a set of ten candidate object models may be evaluated for a multi-unit dwelling. The system computes circulation efficiency for each layout, material cost estimates for shared walls and floors, and compliance with fire safety egress rules. The resulting metrics reveal that three models achieve superior balance across all categories, narrowing the solution set for ranking and selection in step 610.

In step 610, the system ranks candidate object models according to the performance metrics computed in step 608. Optimization engine 170 applies machine-executed ranking logic that orders the candidate models based on normalized performance values, enabling objective comparison across multiple evaluation dimensions. In various embodiments, ranking comprises aggregating metric values into a composite score using weighted criteria. The weighting scheme may prioritize different objectives such as spatial efficiency, material cost, or regulatory compliance, depending on configuration payload parameters received earlier in the process. For example, if user preferences emphasize cost minimization, material usage metrics may be weighted more heavily than circulation efficiency metrics. In another embodiment, compliance is assigned a binary override, automatically excluding any candidate object model that fails constraint checks. The ranking logic may include deterministic ordering, where models are sorted strictly by descending composite scores, or multi-objective ordering, where Pareto-optimal sets of candidates are identified for further consideration. For instance, the system may produce a ranked list where Model A achieves the lowest cost, Model B achieves the highest spatial efficiency, and Model C represents a balanced compromise, all of which are logged with ranking identifiers. In an embodiment, each ranked candidate model is tagged with its composite score, metric breakdown, and lineage identifiers. These results are persisted in candidate model repository 332 and optimization metric log 334 to maintain traceability for audit and reproducibility. For example, a candidate object model for a hotel floor plan may be ranked based on compliance with fire safety egress rules, occupant density, and material usage. The model achieving the best balance across all metrics is placed at the top of the ranking list, ready for best-fit selection in step 612.

In step 612, the system selects an optimized object model from the ranked set of candidate object models. Optimization engine 170 applies best-fit selector 318 to identify the object model that achieves the highest composite score or satisfies a predefined optimization criterion. The selected model becomes the optimized object model that is used for subsequent project planning and construction preparation. In various embodiments, selection comprises evaluating the ranked list of candidates against threshold conditions, objective weights, or explicit user-defined targets. For example, the system may select the candidate with the highest composite score under a cost-efficiency weighting scheme, or alternatively, choose a candidate that minimizes circulation inefficiency while meeting all regulatory compliance checks. Selection logic may also enforce exclusion rules, such as discarding any candidate model that fails structural adjacency requirements or exceeds allowable material usage. The best-fit selector 318 may incorporate deterministic or probabilistic strategies. In deterministic selection, the top-ranked model is automatically chosen. In probabilistic selection, models within a Pareto-optimal set may be sampled based on their relative performance values, allowing the system to accommodate multiple high-performing designs.

For instance, in generating a set of residential layouts for a narrow lot, the system may select the candidate that maximizes habitable floor area while still meeting setback requirements and minimizing material cost. The optimized object model is persisted in candidate model repository 332 with associated metadata, including performance metrics, lineage identifiers, and selection rationale. This ensures that the chosen model can be reproduced, audited, and adapted for later planning. For example, if the selected model represents a multi-unit dwelling, its adjacency graph, circulation paths, and material specifications are encoded into the repository, providing a direct basis for generating project plans in FIG. 4 step 422.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above-mentioned systems, modules, engines, interfaces, components, or databases may comprise hardware and/or software as described herein. For example, the systems described in association with parametric design engine 103, optimization engine 170, planning system 105, and network 150, as well as their subcomponents shown in FIGS. 2 and 3—including user device(s) interface 202, spatial constraint analyzer 206, schema mapper 210, parametric assembly generator 211, metadata propagator 213, constraint solver 219, generation orchestrator 225, performance metric calculator 316, best-fit selector 318, simulation and staffing optimizer 320, and associated databases such as component library database 220, regulatory database 222, material cost database 224, site context database 226, and spatial grammar and IR schema repository 229—may comprise computing hardware and/or software as described herein in association with the figures. Furthermore, any of the above-mentioned systems, modules, engines, interfaces, components, or databases may use and/or comprise an application programming interface (API) for communicating with other systems, modules, engines, interfaces, components, or databases for obtaining and/or providing data or information.

Figure 7:
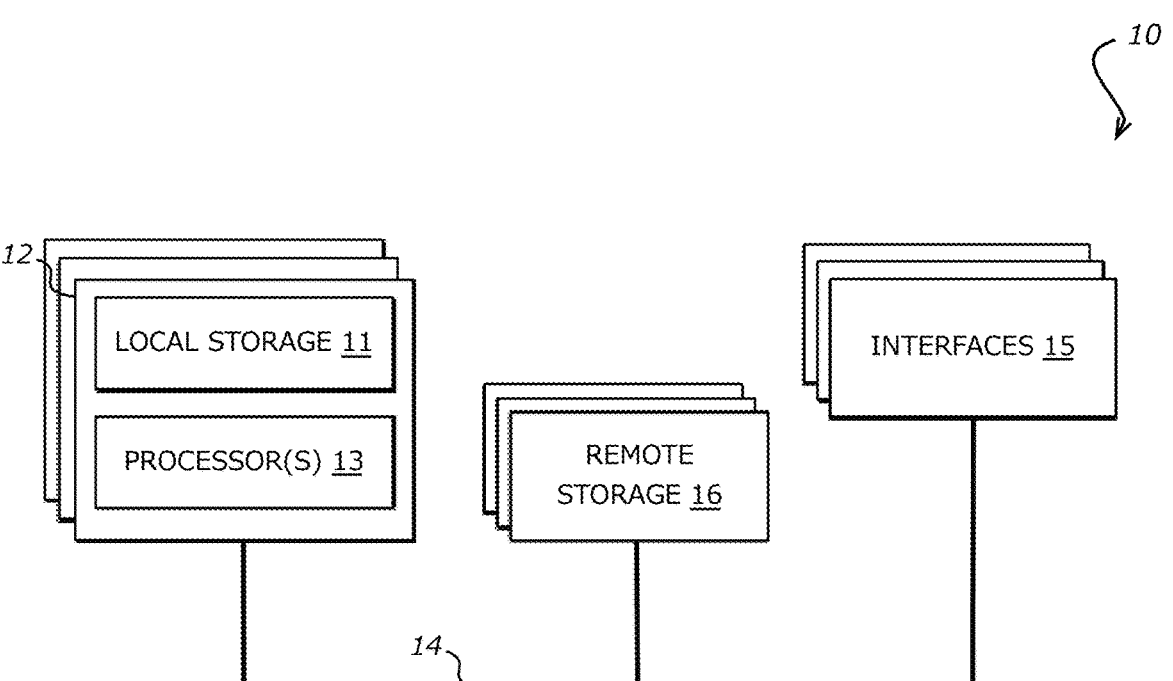
FIG. 7 illustrates an example device-level architecture that can support various embodiments.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 7 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
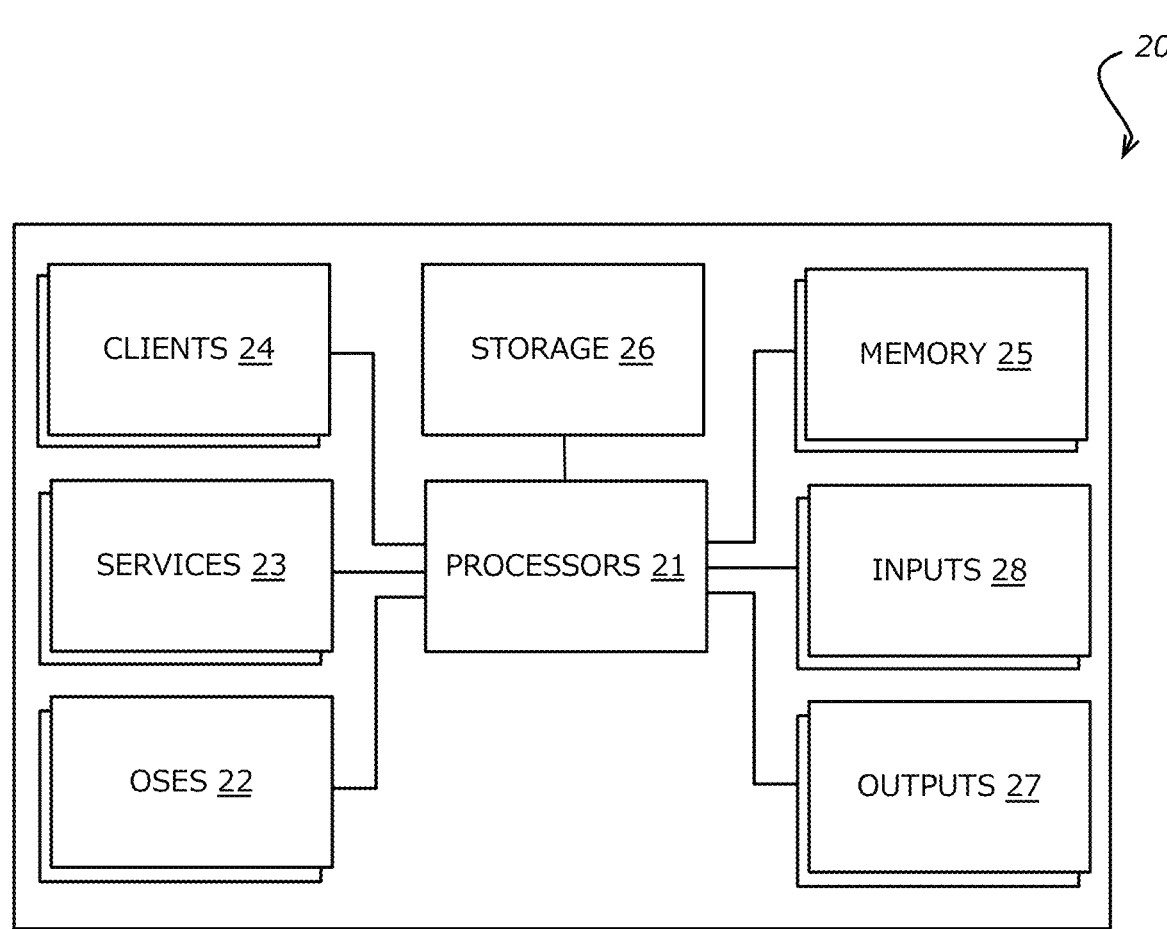
FIG. 8 illustrates components of a computing device in accordance with various embodiments.

In some embodiments, systems may be implemented on a standalone computing system. Referring now to FIG. 8, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 7). Examples of storage devices 26 include flash memory, magnetic hard drive, CD-ROM, and/or the like.

Figure 9:
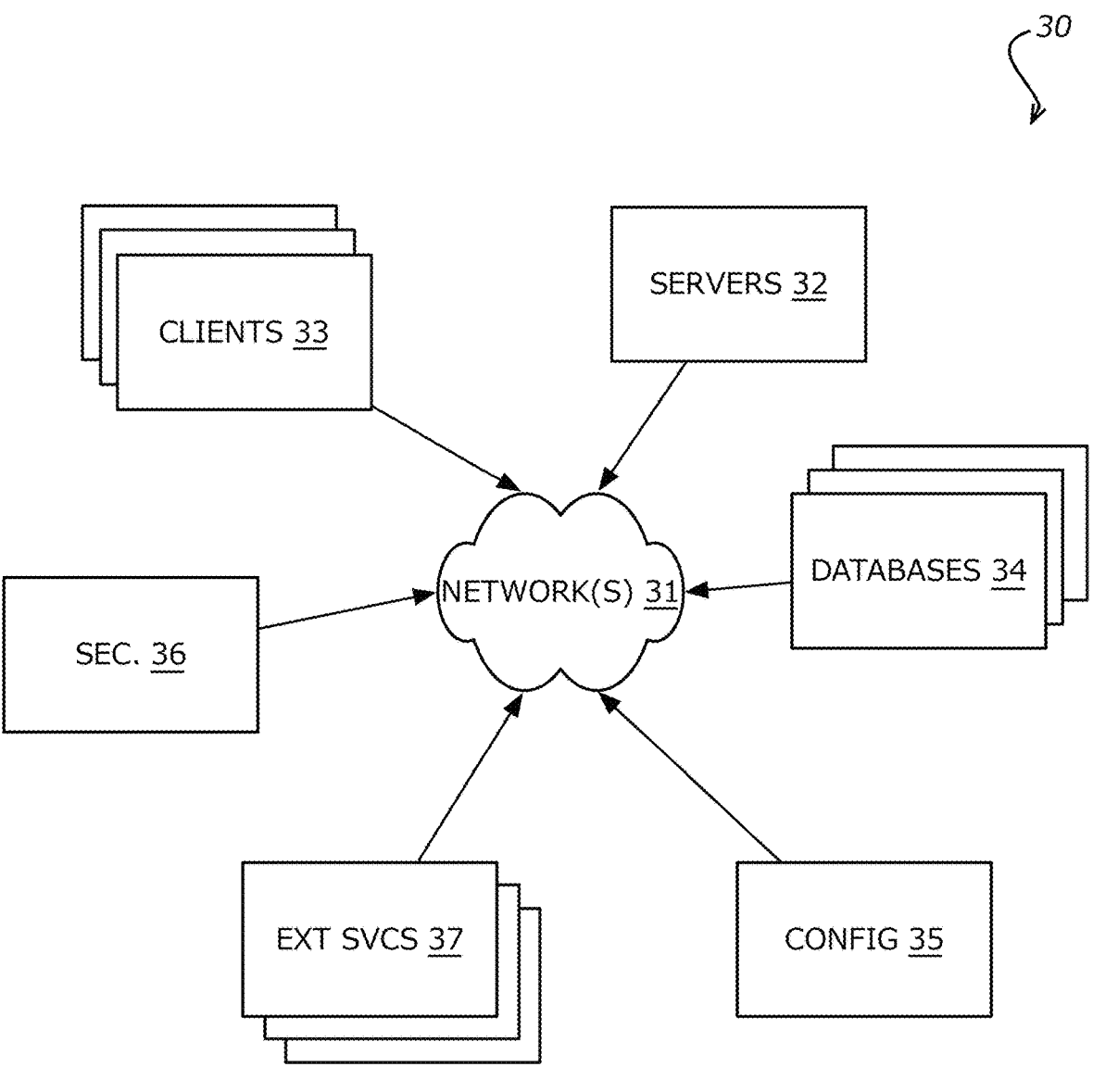
FIG. 9 illustrates an exemplary architecture of a system in accordance with various embodiments.

In some embodiments, systems may be implemented on a distributed computing network, such as one having any number of clients and/or servers. Referring now to FIG. 9, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 8. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 10:
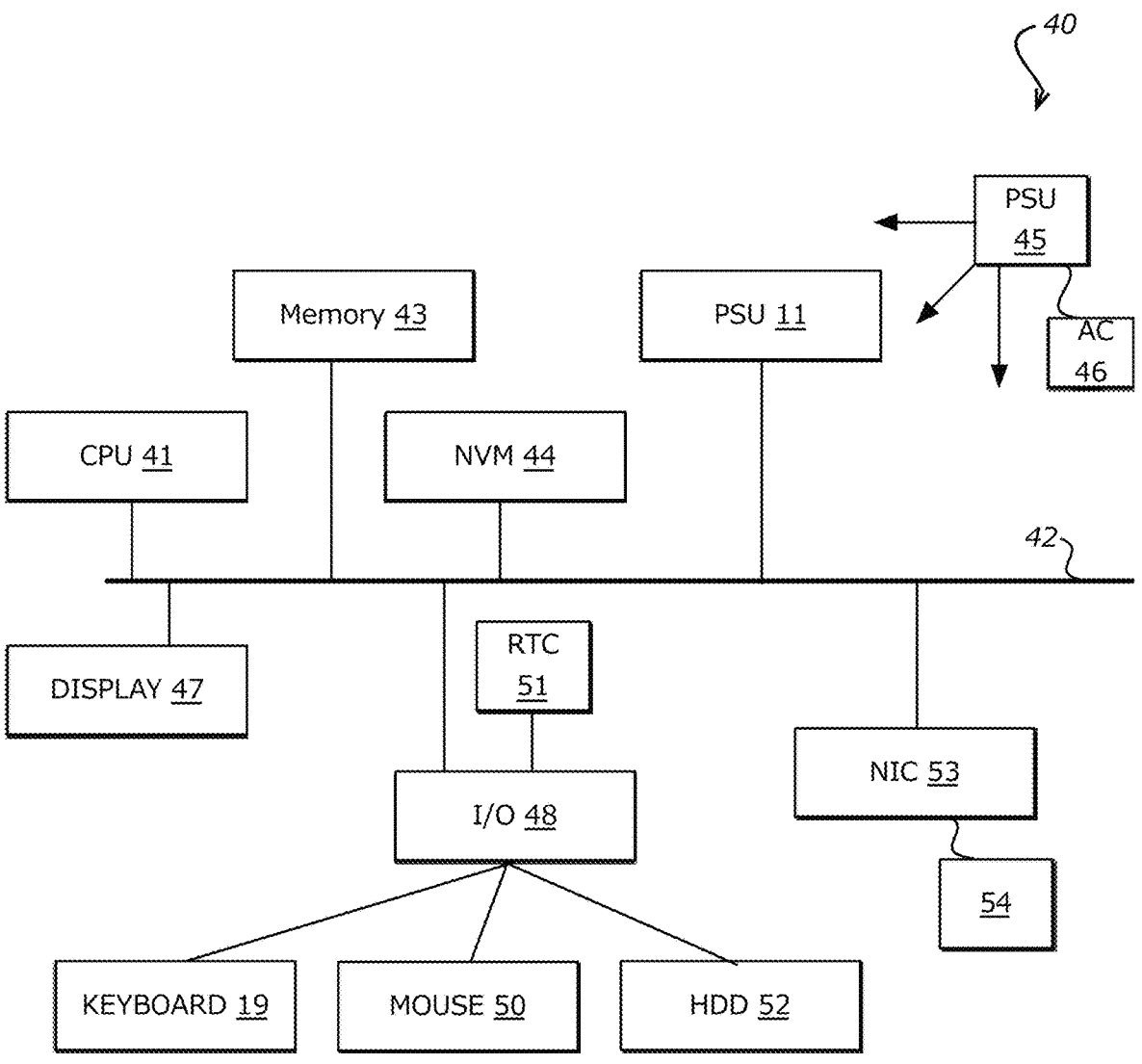
FIG. 10 illustrates components of a computing device in accordance with various embodiments.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computing system for generating and optimizing schema-conformant object models, the computing system comprising:

a processor; and a memory storing instructions that, when executed by the processor, cause the computing system to:

obtain input data from a plurality of data sources, the input data comprising multi-format data representations encoded in a structured, semi-structured, or unstructured format;

process the input data using machine-executed parsing logic to derive a structured rule set defining spatial relationships and constraint conditions;

generate, based on the structured rule set, one or more schema-conformant object representations comprising parametric assemblies of spatial components;

in response to receiving a configuration payload comprising user selections or preference parameters, translate the user selections or preference parameters into constraint objects, combine the constraint objects with rule-based conditions derived from the input data to generate combined constraint conditions, and apply the combined constraint conditions to the one or more schema-conformant object representations using machine-executed constraint resolution logic;

generate candidate object models by iteratively modifying the one or more schema-conformant object representations under the structured rule set, the iteratively modifying comprising at least one of repositioning a spatial component, adjusting a dimensional parameter, or reconfiguring an adjacency relationship;

compute performance values for the candidate object models using machine-executed evaluation logic that applies quantitative analysis of spatial efficiency and constraint compliance; and select an optimized object model from the candidate object models based on computed performance values.

2. The computing system of claim 1, wherein the input data comprises zoning specifications, dimensional surveys, environmental datasets, or material specifications obtained from the plurality of data sources.

3. The computing system of claim 1, wherein processing the input data using machine-executed parsing logic to derive the structured rule set comprises:

tokenizing unstructured text;

applying grammar-based parsing; and mapping extracted elements into schema-conformant constraint objects.

4. The computing system of claim 1, wherein generating the one or more schema-conformant object representations comprises:

constructing a graph-based model;

assigning nodes to parametric assemblies;

assigning edges to adjacency relationships; and encoding assembly attributes in accordance with the structured rule set.

5. The computing system of claim 1, wherein applying the constraint conditions to the one or more schema-conformant object representations comprises:

propagating dimensional limits across adjacency relationships;

resolving conflicts between overlapping spatial components; and enforcing compliance against the structured rule set during model generation.

6. The computing system of claim 1, wherein generating the candidate object models comprises:

iteratively modifying the schema-conformant object representation by reconfiguring adjacency graphs;

adjusting parametric attributes; and regenerating alternative assemblies under the structured rule set.

7. The computing system of claim 1, wherein computing the performance values comprises:

quantifying spatial efficiency by evaluating circulation paths;

determining constraint compliance by applying rule-based validation logic; and calculating material usage from assembly attributes of the candidate object models.

8. The computing system of claim 1, wherein generating the optimized object model based on the computed performance values comprises:

ranking the candidate object models according to the computed performance values; and selecting a model with a highest performance value.

9. The computing system of claim 1, further comprising instructions that, when executed by the processor, cause the computing system to:

generate project plans from the optimized object model, the project plans comprising technical drawings, bill-of-materials, and construction scheduling data.

10. A computer-implemented method, comprising:

obtaining input data from a plurality of data sources, the input data comprising multi-format data representations encoded in a structured, semi-structured, or unstructured format;

processing the input data using machine-executed parsing logic to derive a structured rule set defining spatial relationships and constraint conditions;

generating, based on the structured rule set, one or more schema-conformant object representations comprising parametric assemblies of spatial components;

in response to receiving a configuration payload comprising user selections or preference parameters, translating the user selections or preference parameters into constraint objects, combining the constraint objects with rule-based conditions derived from the input data to generate combined constraint conditions, and applying the combined constraint conditions to the one or more schema-conformant object representations using machine-executed constraint resolution logic;

generating candidate object models by iteratively modifying the one or more schema-conformant object representations under the structured rule set, the iteratively modifying comprising at least one of repositioning a spatial component, adjusting a dimensional parameter, or reconfiguring an adjacency relationship;

computing performance values for the candidate object models using machine-executed evaluation logic that applies quantitative analysis of spatial efficiency and constraint compliance; and selecting an optimized object model from the candidate object models based on computed performance values.

11. The computer-implemented method of claim 10, wherein obtaining the input data comprises obtaining zoning specifications, dimensional surveys, environmental datasets, or material specifications from the plurality of data sources.

12. The computer-implemented method of claim 10, wherein processing the input data using machine-executed parsing logic to derive the structured rule set comprises:

tokenizing unstructured text;

applying grammar-based parsing; and mapping extracted elements into schema-conformant constraint objects.

13. The computer-implemented method of claim 10, wherein generating the one or more schema-conformant object representations comprises:

constructing a graph-based model;

assigning nodes to parametric assemblies;

assigning edges to adjacency relationships; and encoding assembly attributes in accordance with the structured rule set.

14. The computer-implemented method of claim 10, wherein applying the constraint conditions to the one or more schema-conformant object representations comprises:

propagating dimensional limits across adjacency relationships;

resolving conflicts between overlapping spatial components; and enforcing compliance against the structured rule set during model generation.

15. The computer-implemented method of claim 10, wherein computing the performance values comprises:

quantifying spatial efficiency by evaluating circulation paths;

determining constraint compliance by applying rule-based validation logic; and calculating material usage from assembly attributes of the candidate object models.

16. The computer-implemented method of claim 10, further comprising:

ranking the candidate object models according to the computed performance values;

selecting a candidate object model with a highest performance value; and generating project plans from the optimized object model, the project plans comprising technical drawings, bill-of-materials, and construction scheduling data.

17. A non-transitory computer readable storage medium storing instructions that, when executed by at least one processor of a computing system, causes the computing system to:

obtain input data from a plurality of data sources, the input data comprising multi-format data representations encoded in a structured, semi-structured, or unstructured format;

process the input data using machine-executed parsing logic to derive a structured rule set defining spatial relationships and constraint conditions;

generate, based on the structured rule set, one or more schema-conformant object representations comprising parametric assemblies of spatial components;

in response to receiving a configuration payload comprising user selections or preference parameters, translate the user selections or preference parameters into constraint objects, combine the constraint objects with rule-based conditions derived from the input data to generate combined constraint conditions, and apply the combined constraint conditions to the one or more schema-conformant object representations using machine-executed constraint resolution logic;

generate candidate object models by iteratively modifying the one or more schema-conformant object representations under the structured rule set, the iteratively modifying comprising at least one of repositioning a spatial component, adjusting a dimensional parameter, or reconfiguring an adjacency relationship;

compute performance values for the candidate object models using machine-executed evaluation logic that applies quantitative analysis of spatial efficiency and constraint compliance; and select an optimized object model from the candidate object models based on computed performance values.

18. The non-transitory computer readable storage medium of claim 17, wherein the instructions, when executed by the at least one processor, further enables the computing system to:

tokenize unstructured text;

apply grammar-based parsing; and map extracted elements into schema-conformant constraint objects.

19. The non-transitory computer readable storage medium of claim 17, wherein the instructions, when executed by the at least one processor, further enables the computing system to:

construct a graph-based model;

assign nodes to parametric assemblies;

assign edges to adjacency relationships; and encode assembly attributes in accordance with the structured rule set.

20. The non-transitory computer readable storage medium of claim 17, wherein the instructions, when executed by the at least one processor, further enables the computing system to:

propagate dimensional limits across adjacency relationships;

resolve conflicts between overlapping spatial components; and enforce compliance against the structured rule set during model generation.

* * * * *